US012623960B2

(12) United States Patent
Liu et al.

(10) Patent No.: US 12,623,960 B2
(45) Date of Patent: May 12, 2026

(54) COMPOSITE MATERIAL AND PREPARATION FOR THE SAME

(71) Applicant: City University of Hong Kong, Kowloon (HK)

(72) Inventors: Sai Liu, Kowloon (HK); Chi Yan Tso, Kowloon (HK)

(73) Assignee: City University of Hong Kong, Kowloon (HK)

( * ) Notice: Subject to any disclaimer, the term of this patent is extended or adjusted under 35 U.S.C. 154(b) by 313 days.

(21) Appl. No.: 18/330,714

(22) Filed: Jun. 7, 2023

(65) Prior Publication Data

US 2024/0409455 A1 Dec. 12, 2024

(51) Int. Cl.
| | |
|---|---|
| *C03C 17/42* | (2006.01) |
| *C09D 1/00* | (2006.01) |
| *C09D 5/00* | (2006.01) |
| *C09D 5/26* | (2006.01) |
| *C09D 5/29* | (2006.01) |
| *C09D 183/16* | (2006.01) |
| *C09K 9/02* | (2006.01) |

(52) U.S. Cl.
CPC .............. *C03C 17/42* (2013.01); *C09D 1/00* (2013.01); *C09D 5/006* (2013.01); *C09D 5/26* (2013.01); *C09D 5/29* (2013.01); *C09D 183/16* (2013.01); *C09K 9/02* (2013.01); *C03C 2217/732* (2013.01); *C03C 2217/76* (2013.01); *C03C 2218/112* (2013.01); *C03C 2218/116* (2013.01); *C03C 2218/32* (2013.01); *C09K 2211/10* (2013.01)

(58) Field of Classification Search
CPC ........ C09D 5/006; C09D 5/26; C03C 2217/76
See application file for complete search history.

(56) References Cited

U.S. PATENT DOCUMENTS

| | | | | |
|---|---|---|---|---|
| 6,228,804 B1* | 5/2001 | Nakashima | ........... | G02F 1/0147 |
| | | | | 503/201 |
| 2009/0011222 A1* | 1/2009 | Xiu | ......... | C23C 24/00 |
| | | | | 427/430.1 |
| 2013/0337274 A1* | 12/2013 | Ozaki | ..... | C09D 5/006 |
| | | | | 252/582 |
| 2015/0362763 A1* | 12/2015 | Wheeler | ......... | G01J 5/20 |
| | | | | 156/247 |
| 2023/0167355 A1* | 6/2023 | Rosales | ..... | C08K 5/19 |
| | | | | 252/583 |

OTHER PUBLICATIONS

Jeong et al. (Materials Research Bulletin, vol. 175, Jul. 2024, 112777 (Year: 2024).*
Ye, H., Meng, X. & Xu, B. Theoretical discussions of perfect window, ideal near infrared solar spectrum regulating window and current thermochromic window. Energy Build. 49, 164-172 (2012).

(Continued)

*Primary Examiner* — Alexandre F Ferre
(74) *Attorney, Agent, or Firm* — Renner, Kenner, Greive, Bobak, Taylor & Weber

(57) ABSTRACT

A composite material comprising a first layer of thermochromic perovskite; a second layer of antireflection material including an organic or inorganic polymer deposited on the first layer; and a third layer of hydrophobic material deposited on the second layer. A method for preparing the composite material is also addressed.

25 Claims, 52 Drawing Sheets

(56) References Cited

OTHER PUBLICATIONS

S. Wang, T. Jiang, Y. Meng, R. Yang, G. Tan, Y. Long, Scalable thermochromic smart windows with passive radiative cooling regulation. Science (1979). 374, 1501-1504 (2021).

C. Lin, J. Hur, C. Y. H. Chao, G. Liu, S. Yao, W. Li, B. Huang, All-weather thermochromic windows for synchronous solar and thermal radiation regulation. Sci Adv. 8, eabn7359 (2022).

J. Paulos, U. Berardi, Optimizing the thermal performance of window frames through aerogel-enhancements. Appl Energy. 266, 114776 (2020).

Long, H. Ye, H. Zhang, Y. Gao, Performance demonstration and simulation of thermochromic double glazing in building applications. Solar Energy. 120, 55-64 (2015).

Y. Zhou, M. Layani, F. Y. C. Boey, I. Sokolov, S. Magdassi, Y. Long, Electro-Thermochromic Devices Composed of Self-Assembled Transparent Electrodes and Hydrogels. Adv Mater Technol. 1, 3-9 (2016).

Wang, Y. Liu, X. Zhan, D. Luo, X. Sun, Photochromic transparent wood for photo-switchable smart window applications. J Mater Chem C Mater. 7, 8649-8654 (2019).

G. Xu, H. Xia, P. Chen, W. She, H. Zhang, J. Ma, Q. Ruan, W. Zhang, Z. Sun, Thermochromic Hydrogels with Dynamic Solar Modulation and Regulatable Critical Response Temperature for Energy-Saving Smart Windows. Adv Funct Mater, 2109597 (2021).

Y. Zhou, X. Dong, Y. Mi, F. Fan, Q. Xu, H. Zhao, S. Wang, Y. Long, Hydrogel smart windows. J Mater Chem A Mater. 3, 10007-10025 (2020).

M. Aburas, V. Soebarto, T. Williamson, R. Liang, H. Ebendorff-Heidepriem, Y. Wu, Thermochromic smart window technologies for building application: A review. Appl Energy. 255, 113522 (2019).

A. A. Zhumekenov, M. I. Saidaminov, O. F. Mohammed, O. M. Bakr, Stimuli-responsive switchable halide perovskites: Taking advantage of instability. Joule. 5 (2021), pp. 2027-2046.

J. Lin, M. Lai, L. Dou, C. S. Kley, H. Chen, F. Peng, J. Sun, D. Lu, S. A. Hawks, C. Xie, F. Cui, A. P. Alivisatos, D. T. Limmer, P. Yang, Thermochromic halide perovskite solar cells. Nat Mater. 17, 261-267 (2018).

L. M. Wheeler, D. T. Moore, R. Ihly, N. J. Stanton, E. M. Miller, R. C. Tenent, J. L. Blackburn, N. R. Neale, Switchable photovoltaic windows enabled by reversible photothermal complex dissociation from methylammonium lead iodide. Nat Commun. 8, 1-9 (2017).

B. A. Rosales, L. E. Mundt, L. T. Schelhas, L. M. Wheeler, Reversible Methanolation of Metal Halide Perovskites. J Am Chem Soc. 144, 667-672 (2022).

Y. Zhang, C. Y. Tso, J. S. Iñigo, S. Liu, H. Miyazaki, C. Y. H. Chao, K. M. Yu, Perovskite thermochromic smart window: Advanced optical properties and low transition temperature. Appl Energy, doi:10.1016/j.apenergy.2019.113690.

S. Liu, Y. W. Du, C. Y. Tso, H. H. Lee, R. Cheng, S. P. Feng, K. M. Yu, Organic Hybrid Perovskite (MAPbl3-xClx) for Thermochromic Smart Window with Strong Optical Regulation Ability, Low Transition Temperature, and Narrow Hysteresis Width. Adv Funct Mater. 31, 1-12 (2021).

S. Liu, Y. Li, Y. Wang, K. M. Yu, B. Huang, C. Y. Tso, Near-Infrared-Activated Thermochromic Perovskite Smart Windows. Advanced Science. 2106090, 2106090 (2022).

A. Roy, H. Ullah, A. Ghosh, H. Baig, S. Sundaram, A. A. Tahir, T. K. Mallick, Understanding the Semi-Switchable Thermochromic Behavior of Mixed Halide Hybrid Perovskite Nanorods. The Journal of Physical Chemistry C. 125, 18058-18070 (2021).

Y. Du, S. Liu, Z. Zhou, H. H. Lee, T. C. Ho, S. P. Feng, C. Y. Tso, Study on the halide effect of MA4PbX6-2H2O hybrid perovskites—From thermochromic properties to practical deployment for smart windows. Materials Today Physics. 23, 100624 (2022).

B. A. Rosales, J. Kim, V. M. Wheeler, L. E. Crowe, K. J. Prince, M. Mirzokarimov, T. Daligault, A. Duell, C. A. Wolden, L. T. Schelhas, L. M. Wheeler, Thermochromic Halide Perovksite Windows with Ideal Transition Temperatures. Adv Energy Mater, 2203331 (2023).

B. A. Rosales, L. E. Mundt, T. G. Allen, D. T. Moore, K. J. Prince, C. A. Wolden, G. Rumbles, L. T. Schelhas, L. M. Wheeler, Reversible multicolor chromism in layered formamidinium metal halide perovskites. Nat Commun. 11, 1-12 (2020).

H. Zhang, K. Li, M. Sun, F. Wang, H. Wang, A. K. Y. Jen, Design of Superhydrophobic Surfaces for Stable Perovskite Solar Cells with Reducing Lead Leakage. Adv Energy Mater. 11, 1-11 (2021).

M. Li, H. Li, J. Fu, T. Liang, W. Ma, Recent Progress on the Stability of Perovskite Solar Cells in a Humid Environment. The Journal of Physical Chemistry C. 124, 27251-27266 (2020).

S. Chen, Y. Deng, H. Gu, S. Xu, S. Wang, Z. Yu, V. Blum, J. Huang, Trapping lead in perovskite solar modules with abundant and low-cost cation-exchange resins. Nat Energy. 5, 1003-1011 (2020).

Y. Jiang, L. Qiu, E. J. Juarez-Perez, L. K. Ono, Z. Hu, Z. Liu, Z. Wu, L. Meng, Q. Wang, Y. Qi, Reduction of lead leakage from damaged lead halide perovskite solar modules using self-healing polymer-based encapsulation. Nat Energy. 4, 585-593 (2019).

Y. Zhang, Z. Wang, S. Hu, P. Yan, H. Li, C. X. Sheng, Robust and Swiftly Reversible Thermochromic Behavior of a 2D Perovskite of (C6H4(CH2NH3)2)(CH3NH3)[Pb217] for Smart Window and Photovoltaic Smart Window Applications. ACS Appl Mater Interfaces. 4 (2021), doi:10.1021/acsami.1c00163.

Y. Li, H. Sun, Z. Li, M. Wang, L. Guo, L. Min, F. Cao, Y. Tan, L. Li, Electrospun perovskite nano-network for flexible, hear-room temperature, environmentally friendly and ultrastable light regulation. J Mater Sci Technol. 130, 35-43 (2022).

A. Halder, D. Choudhury, S. Ghosh, A. S. Subbiah, S. K. Sarkar, Exploring Thermochromic Behavior of Hydrated Hybrid Perovskites in Solar Cells. Journal of Physical Chemistry Letters. 6, 3180-3184 (2015).

S. Tombe, G. Adam, H. Heilbrunner, C. Yumusak, D. H. Apaydin, B. Hailegnaw, C. Ulbricht, C. J. Arendse, H. Langhals, E. Iwuohaa, N. S. Sariciftci, M. C. Scharber, The influence of perovskite precursor composition on the morphology and photovoltaic performance of mixed halide MAPbl3-xClx solar cells. Solar Energy. 163, 215-223 (2018).

M. Abboah-Offei, Y. Salifu, B. Adewale, J. Bayuo, R. Ofosu-Poku, E. B. A. Opare-Lokko, A rapid review of the use of face mask in preventing the spread of COVID-19. Int J Nurs Stud Adv. 3, 100013 (2021).

K. Zhang, T. N. Vilches, M. Tariq, A. P. Galvani, S. M. Moghadas, The impact of mask-wearing and shelter-in-place on COVID-19 outbreaks in the United States. International Journal of Infectious Diseases. 101, 334-341 (2020).

J. J. Bartoszko, M. A. M. Farooqi, W. Alhazzani, M. Loeb, Medical masks vs N95 respirators for preventing COVID-19 in healthcare workers: A systematic review and meta-analysis of randomized trials. Influenza Other Respir Viruses. 14, 365-373 (2020).

S. Adanur, A. Jayswal, Filtration mechanisms and manufacturing methods of face masks: An overview. 51, 3683-3717 (2022).

T. Karabacak, T. M. Lu, Enhanced step coverage by oblique angle physical vapor deposition. J Appl Phys. 97, 124504 (2005).

N. Pittman, T. M. Lu, Growth front smoothing effects in extremely high pressure vapor deposition. Scientific Reports 2020 10:1. 10, 1-7 (2020).

I. A. Channa, A. Distler, M. Zaiser, C. J. Brabec, H. J. Egelhaaf, Thin Film Encapsulation of Organic Solar Cells by Direct Deposition of Polysilazanes from Solution. Adv Energy Mater. 9, 1-10 (2019).

E. Gu, X. Tang, S. Langner, P. Duchstein, Y. Zhao, I. Levchuk, V. Kalancha, T. Stubhan, J. Hauch, H. J. Egelhaaf, D. Zahn, A. Osvet, C. J. Brabec, Robot-Based High-Throughput Screening of Antisolvents for Lead Halide Perovskites. Joule. 4, 1806-1822 (2020).

J. Sun, F. Li, J. Yuan, W. Ma, Advances in Metal Halide Perovskite Film Preparation: The Role of Anti-Solvent Treatment. Small Methods. 5, 1-17 (2021).

M. Saliba, J. P. Correa-Baena, C. M. Wolff, M. Stolterfoht, N. Phung, S. Albrecht, D. Neher, A. Abate, How to Make over 20% Efficient Perovskite Solar Cells in Regular (n-i-p) and Inverted (p-i-n) Architectures. Chemistry of Materials. 30, 4193-4201 (2018).

Y. Li, C. Lin, Z. Wu, Z. Chen, C. Chi, F. Cao, D. Mei, H. Yan, C. Y. Tso, C. Y. H. Chao, B. Huang, Solution-Processed All-Ceramic Plasmonic Metamaterials for Efficient Solar-Thermal Conversion over 100-727° C. Advanced Materials. 33, 14-17 (2021).

(56)        References Cited

OTHER PUBLICATIONS

X. Cao, L. Hao, Z. Liu, G. Su, X. He, Q. Zeng, J. Wei, All green solvent engineering of organic-inorganic hybrid perovskite layer for high-performance solar cells. Chemical Engineering Journal. 437, 135458 (2022).

P. K. Freeman, R. Srinivasa, Photochemistry of Polychlorinated Phenoxyphenols. 3. Solvent Effects on the Photochemical Transformations of 3, 4, 5, 6-Tetrachloro-2-(Pentachlorophenoxy)Phenol. J Agric Food Chem. 32, 1313-1316 (1984).

H. Kanda, N. Shibayama, A. J. Huckaba, Y. Lee, S. Paek, N. Klipfel, C. Roldan-Carmona, V. I. E. Queloz, G. Grancini, Y. Zhang, M. Abuhelaiqa, K. T. Cho, M. Li, M. D. Mensi, S. Kinge, M. K. Nazeeruddin, Band-bending induced passivation: High performance and stable perovskite solar cells using a perhydropoly(silazane) precursor. Energy Environ Sci. 13, 1222-1230 (2020).

S. Liu, C. Y. Tso, Y. W. Du, L. C. Chao, H. H. Lee, T. C. Ho, M. K. H. Leung, Bioinspired thermochromic transparent hydrogel wood with advanced optical regulation abilities and mechanical properties for windows. Appl Energy. 297, 117207 (2021).

Y. Li, E. Vasileva, I. Sychugov, S. Popov, L. Berglund, Optically Transparent Wood: Recent Progress, Opportunities, and Challenges. Adv Opt Mater. 6 (2018), doi:10.1002/adom.201800059.

F. Xu, X. Cao, H. Luo, P. Jin, Recent advances in VO2-based thermochromic composites for smart windows. J Mater Chem C Mater. 6, 1903-1919 (2018).

Y. Cui, Y. Ke, C. Liu, Z. Chen, N. Wang, L. Zhang, Y. Zhou, S. Wang, Y. Gao, Y. Long, Thermochromic VO2 for Energy-Efficient Smart Windows. Joule. 2, 1707-1746 (2018).

F. B. Leloup, S. Forment, p. Dutre, M. R. Pointer, P. Hanselaer, Design of an instrument for measuring the spectral bidirectional scatter distribution function. Applied Optics, vol. 47, Issue 29, pp. 5454-5467. 47, 5454-5467 (2008).

J. Song, W. Zhang, Z. Sun, M. Pan, F. Tian, X. Li, M. Ye, X. Deng, Durable radiative cooling against environmental aging. Nat Commun. 13, 1-12 (2022).

J. F. Condeles, R. A. Ando, M. Mulato, Optical and structural properties of PbI2 thin films. J Mater Sci. 43, 525-529 (2008).

Kamalisarvestani, M., Saidur, R., Mekhilef, S. & Javadi, F. S. Performance, materials and coating technologies of thermochromic thin films on smart windows. Renew. Sustain. Energy Rev. 26, 353-364 (2013).

* cited by examiner

| Element | Weight% | Atomic% |
|---|---|---|
| N K | 36.9 | 43.9 |
| O K | 41.6 | 43.3 |
| Si K | 21.5 | 12.7 |

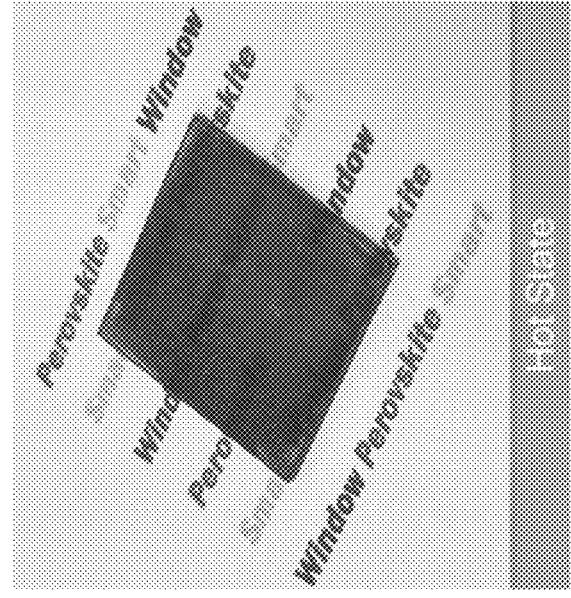
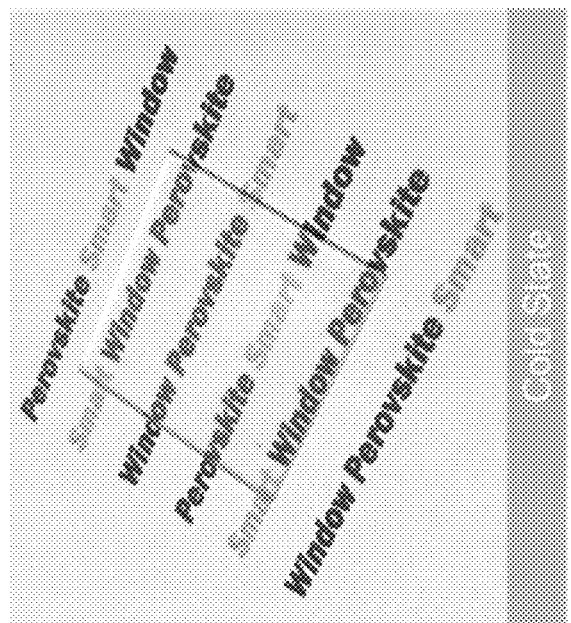
Fig. 7

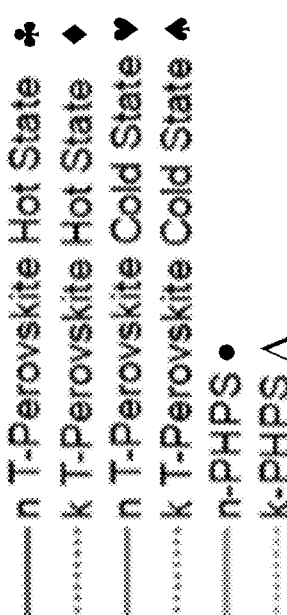
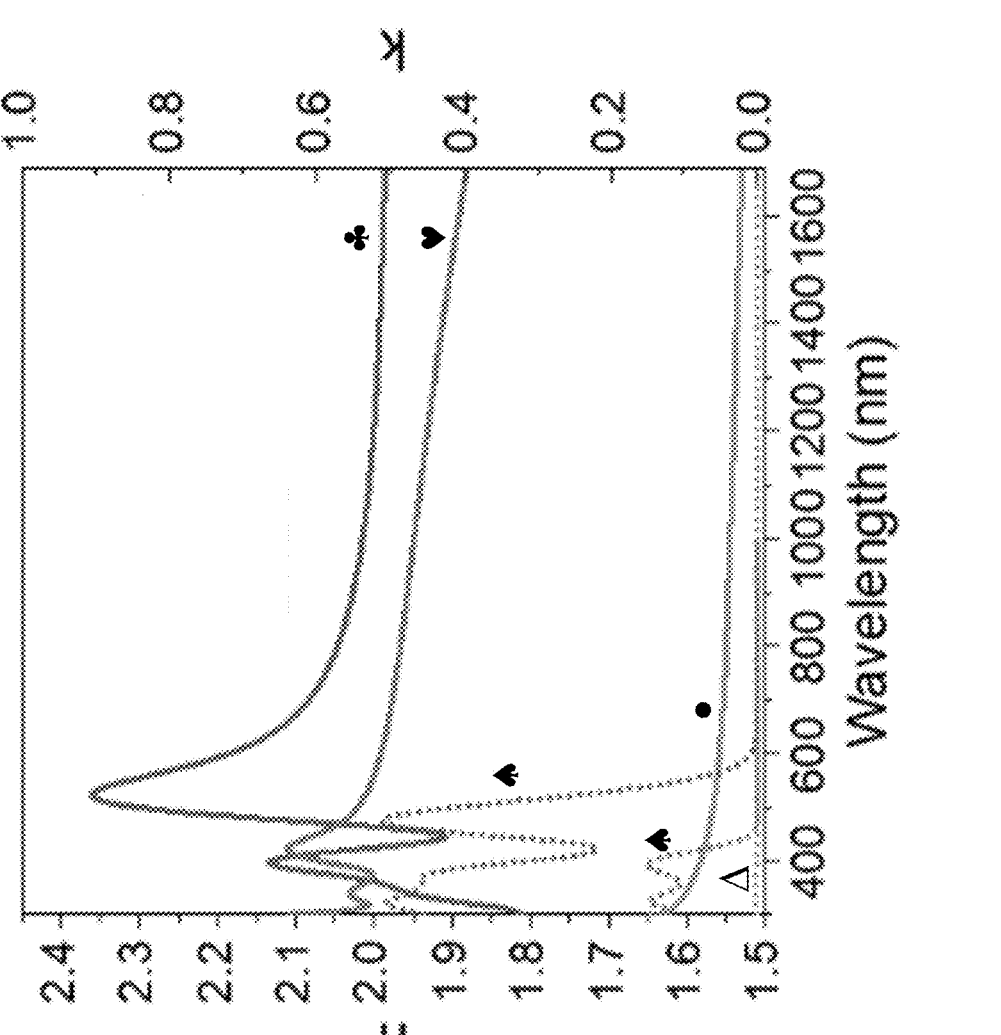
Fig. 8

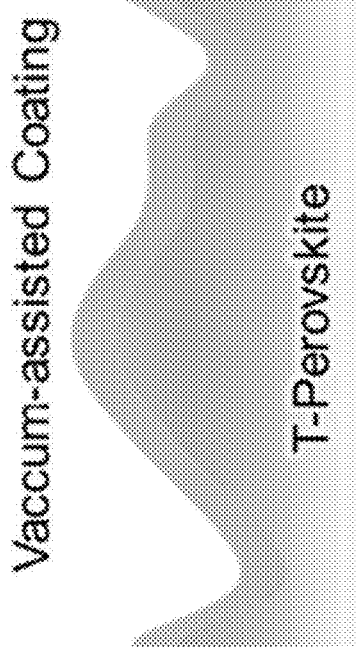
Vaccum-assisted Coating
T-Perovskite
Fig. 10A
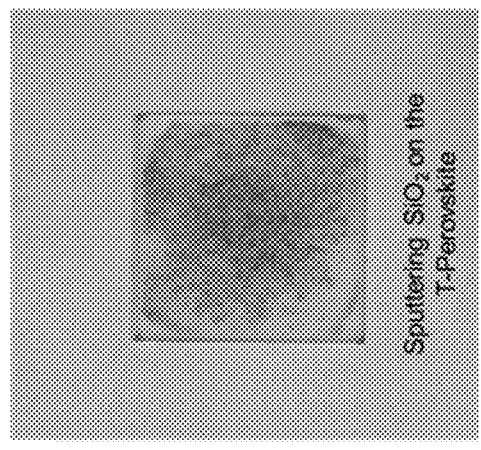
Sputtering SiO₂ on the T-Perovskite
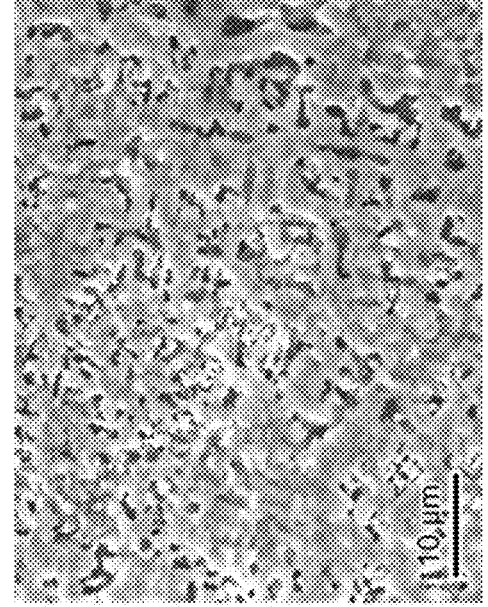
Fig. 10B

Fig. 12

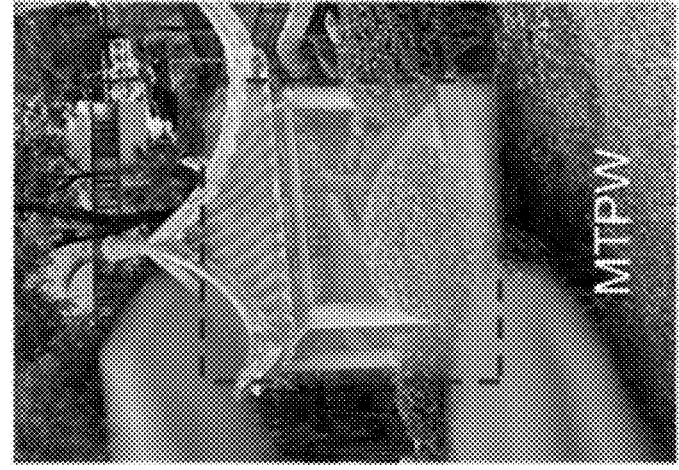
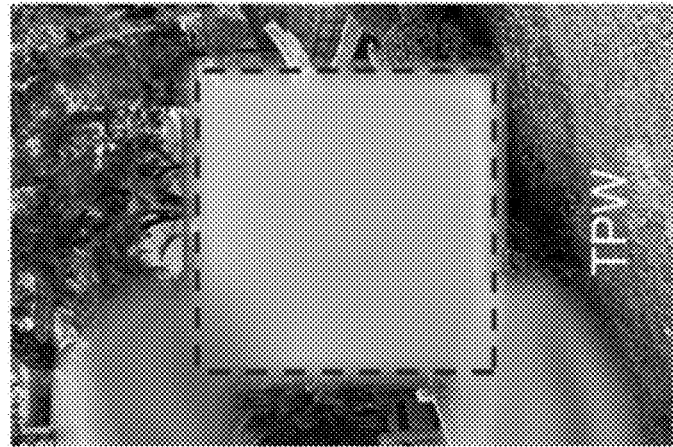
Haze Comparison
Fig. 16

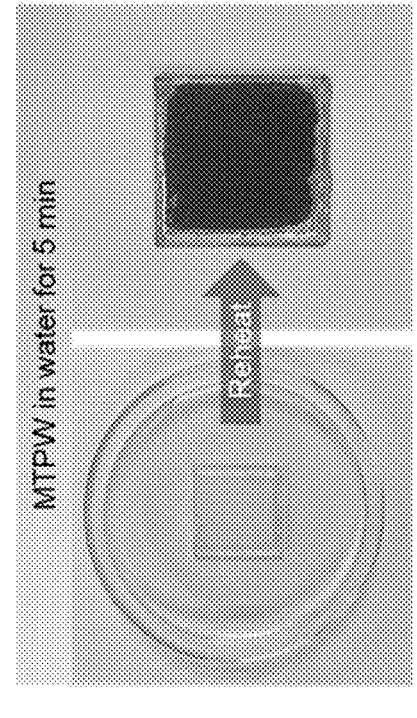
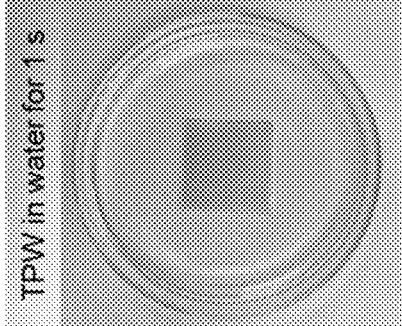
Fig. 39A
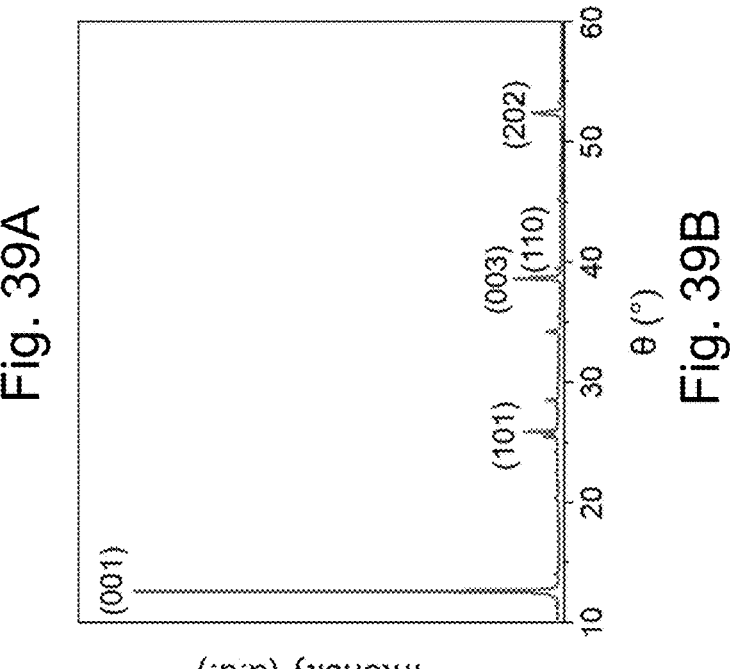
Fig. 39B

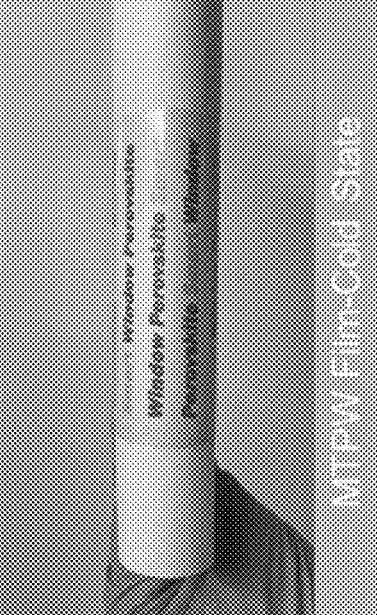
Fig. 40A
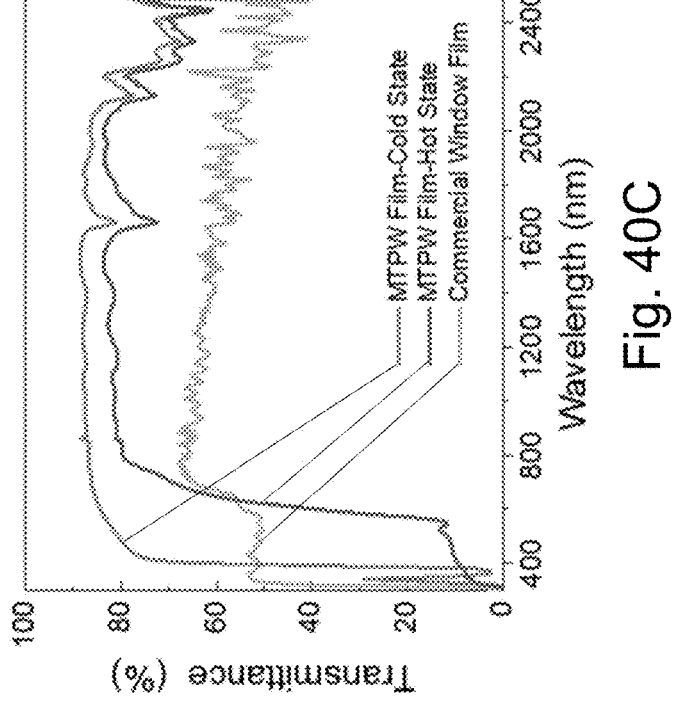
Fig. 40C
Fig. 40B

| | |
|---|---|
| Building type | Apartment |
| Number of Floors | 10 |
| Total Floor Area | 46.3 m × 16.9 m |
| Average Window-to-Wall Ratio | 30% |
| HVAC System | Water source heat pumps |
| Temperature Set Point for HVAC Control | Below 21.1 °C for heating/Above 23.8 °C for cooling |

Fig. 42

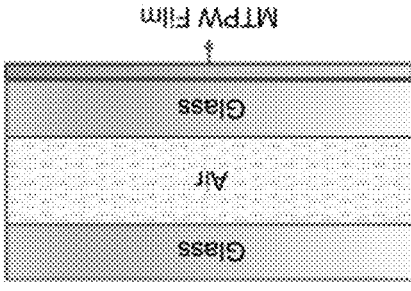
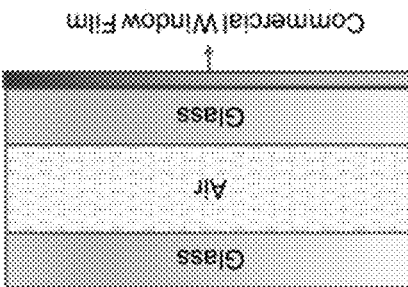
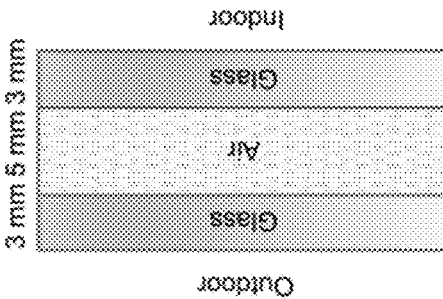
Fig. 43

| States | Normal Window | Commercial Window Film Pasted on the Window | MTPW Film Pasted on the Window | |
|---|---|---|---|---|
| | - | - | Cold State | Hot State |
| Solar Transmittance | 0.6205 | 0.4109 | 0.5883 | 0.3536 |
| Solar Front Reflectance | 0.1933 | 0.1690 | 0.1888 | 0.1788 |
| Solar Back Reflectance | 0.2276 | 0.1440 | 0.2075 | 0.1428 |
| Visible Transmittance | 0.7222 | 0.4277 | 0.6922 | 0.1934 |
| Visible Front Reflectance | 0.2309 | 0.2003 | 0.2337 | 0.2161 |
| Visible Back Reflectance | 0.2357 | 0.1251 | 0.2304 | 0.1934 |

Fig. 44

| City (from north to south) | Climate Types | Average Temperature (1991-2020) |
|---|---|---|
| New York | Continental: cold winters and hot summers. | Mean: 0.8–25.3 °C Max: 29.5 °C Min: -2.7 °C |
| Philadelphia | Continental: cold winters and hot summers | Mean: 1.3–25.6 °C Max: 31.2 °C Min: -3.3 °C |
| Washington (D.C.) | Semicontinental: cold winters and hot, muggy summers. | Mean: 3–27.2 °C Max: 32 °C Min: -1.1 °C |
| Atlanta | Humid subtropical: mild and rainy winters and hot, muggy summers. | Mean: 7.1–27.2 °C Max: 32.3 °C Min: 2 °C |
| Orlando | Subtropical: very mild winters and hot, humid summers. | Mean: 15.9–28.1 °C Max: 33.3 °C Min: 9.7 °C |

Fig. 45

COMPOSITE MATERIAL AND PREPARATION FOR THE SAME

TECHNICAL FIELD

The present invention relates a composite material for example particularly, but not exclusively, a thermochromic composite material comprising a thermochromic perovskite and a layer of material arranged to protect the thermochromic perovskite from excessive water contact; and a method for preparing the composite material.

BACKGROUND OF THE INVENTION

As a result of rapid urbanization, modern buildings are responsible for over 40% of the global primary energy consumption, causing over 30% of greenhouse gas emissions in cities. With stricter aesthetic requirements for buildings, an extremely high window-to-wall ratio has become a characteristic of modern architecture. However, both the unchangeable high transmittance under intense sunlight and the high U value of glass make windows the major sources of heat loss/gain among all building envelopes. Therefore, energy-saving smart windows whose solar transmittance can be dynamically regulated have recently attracted increasing attention to balance the goal of less energy consumption with the aesthetic demand for more glazing.

One of the widely studied smart windows may be thermochromic smart windows, which generally makes use of the thermochromism of metal halide perovskites for managing buildings' energy usage and temperature. The color switch of thermochromic perovskites (T-Perovskites) generally relies on the $H_2O$ dissociation from and rebonding to the T-Perovskite layer, such as by the following chemical reaction:

$$MAPbX_3 + 3\ MAX + 2H_2O \leftrightarrow MA_4PbX_6 \cdot 2H_2O$$

where MA is $CH_3NH_3^+$, and X is the halide anion. That said, on the one hand, water is essential to induce the thermochromic effect of T-Perovskites. On the other hand, water could degrade/corrode T-Perovskites especially when the T-Perovskites are continuously subjected to high-humidity environments or water droplets. In particular, excessive water may cause ultrahigh optical haze and blurry view through the T-Perovskites windows as a result of the presence of excessive MAX that would influence the crystallization process upon the color switch. In addition, the excessive water may also act as a solvent to dissolve the lead content in the T-Perovskites upon the thermochromic process, leading to lead leakage, threatening the environment and public health.

Whilst there are reports of circumventing the problems above, those methods typically would either cause another problem or have to sacrifice the optical and transition performance of T-Perovskites. For example, one common method to protect T-Perovskites may be sealing them in a double-glazed window. However, this method requires tight packaging, making assembly of the window difficult, with a risk of leakage during long-term use. Alternatively, the T-Perovskites may be protected by covering with a protection layer, yet this method could result in insufficient water vapor supply to the T-Perovskites for enabling color switching. In another method, it may reduce the dimensions of the T-Perovskite to 2D. However, 2D T-Perovskites generally suffer from high $T_c$ (>60° C.) and a long transition time (t>6 hours), which is basically not comparable with their 3D counterparts whose $T_c$ values are near room temperature and t values are only several minutes. Thus, the development of durable and water-repellent T-Perovskite windows with outstanding optical and transition properties remains a challenge.

The invention seeks to eliminate or at least to mitigate such shortcomings by providing a new or otherwise improved composite material, in particular, a composite material comprising a thermochromic perovskite and a layer of material arranged to protect the thermochromic perovskite from excessive water contact upon window application.

SUMMARY OF THE INVENTION

In a first aspect of the present invention, there is provided a composite material comprising: a first layer of thermochromic perovskite; a second layer of antireflection material comprising an organic or inorganic polymer deposited on the first layer; and a third layer of hydrophobic material deposited on the second layer.

In an optional embodiment, the first layer comprises a substrate being made of glass or PET with a layer of thermochromic perovskite deposited thereon. Optionally, the thermochromic perovskite comprises a halide perovskite-based compound having a general formula of $A_4BX_6 \cdot 2H_2O$, with A being a monovalent organic cation, B being a bivalent cation, and X being one or more of a halide. It is optional that $A_4BX_6 \cdot 2H_2O$ is reversibly changed to $ABX_3$ in response to a temperature change. Optionally, A is selected from any one of $CH_3NH_3^+$ and $CH(NH_2)_2^+$; B is selected from any one of $Pb^{2+}$, $Sn^{2+}$, $Ge^{2+}$, $Mg^{2+}$, and $Ca^{2+}$; and X is selected from any one of $I^-$, $Br^-$, $Cl^-$ and a combination thereof.

In an optional embodiment, the halide perovskite-based compound has a general formula of $(CH_3NH_3)_4 PbI_{6-x-y}Br_xCl_y \cdot 2H_2O$, with x and y each being 0 or a positive integer, and x+y≤6.

In an embodiment of the invention, the halide perovskite-based compound is $(CH_3NH_3)_4PbI_{6-y}Cl_y \cdot 2H_2O$, with y being 0 to 6. It is optional that the layer of thermochromic perovskite is 1.6 μm thick.

Optionally, the antireflection material has a refractive index that is in between air and the thermochromic perovskite. It is optional that the antireflection material comprises any one of epoxy, poly(methyl methacrylate), polyvinylpyrrolidone, poly(vinyl alcohol), polydimethylsiloxane, poly (acrylic acid), poly(acrylamide), poly(aniline), poly(ethylene oxide), poly(N-acryloxysuccinimide), poly(N-isopropylacrylamide), poly(N-isopropylmethacrylamide), poly(N-vinylcaprolactam), poly(N-vinylpyrrolidone), poly (methacrylic acid), poly(styrene sulfonic acid), polyurethane, poly(propylene oxide), perhydropolysilazane or a combination thereof.

In an embodiment of the invention, the antireflection material is perhydropolysilazane. Optionally, the perhydropolysilazane takes the form of a homogenous inorganic film comprising $SiO_x/SiON_x$.

It is optional that the hydrophobic material comprises a superhydrophobic layer. In an embodiment of the invention, the superhydrophobic layer comprises a layer of fluorinated nanocoating. Optionally, the layer of fluorinated nanocoating is any one of fluorinated $SiO_2$, fluorinated $TiO_2$, and fluorinated ZnO.

In a second aspect of the present invention, there is provided a method of for preparing the composite material in accordance with the first aspect, comprising the steps of: coating a thermochromic perovskite on a substrate being made of glass or PET to form a first layer; coating an antireflection material on the first layer to form a second layer; and coating a silica-based nanoparticles on the second layer to form a third layer.

Optionally, the thermochromic perovskite is subjected to annealing after it is coated on the substrate to form the first layer.

In an embodiment of the invention, the thermochromic perovskite is a halide perovskite-based precursor of $(CH_3NH_3)_4PbI_{6-y}Cl_y \cdot 2H_2O$, with y being 0 to 6, prepared by mixing $CH_3NH_3I$ and $PbCl_2$ in a molar ratio of about 6.5:1. Optionally, the annealing is at about 100° C. for about 1 hour.

It is optional that the antireflection material comprises a homogenous inorganic material that is solidified by curing after being spin-coated or blade-coated on the first layer.

In an embodiment of the invention, the homogenous inorganic material is prepared from perhydropolysilazane dissolved in dibutyl ether.

It is optional that the first, second and third layers are formed by solution-based coating method. In an optional embodiment, the first and second layers are formed by spin-coating. In a further optional embodiment, the third layer is formed by ultrasonic spray-coating.

In an embodiment of the invention, the silica-based nanoparticles are $SiO_2$ nanoparticles, such as fluorinated $SiO_2$ nanoparticles, which are deposited on the second layer by coating a solution of the $SiO_2$ nanoparticles and atomizing solvent in the solution simultaneously by way of ultrasonic spray-coating method.

BRIEF DESCRIPTION OF DRAWINGS

The invention will now be more particularly described, by way of example only, with reference to the accompanying drawings, in which:

FIG. 7 shows the photographs of the MTPW at its cold and hot states;

FIG. 8 shows the complex refractive index of $H-MAIPbI_{3-x}Cl_x$ ($MA_4PbI_{6-x}Cl_x \cdot 2H_2O$ or $(CH_3NH_3)_4$ $PbI_{6-y}Cl_y \cdot 2H_2O$ of the present invention) at the cold and hot states;

FIG. 10A is a schematic diagram illustrating the vacuum-assisted deposition coating;

FIG. 10B shows the SEM image of sputtering $SiO_2$ on the T-Perovskite (left) and the photos of the T-Perovskite after the magnetron sputtering (right);

FIG. 12 is a schematic diagram illustrating the solution-based coating;

FIG. 16 shows the photographs of the TPW and MTPW comparing their optical haze;

5

Figure 36B:
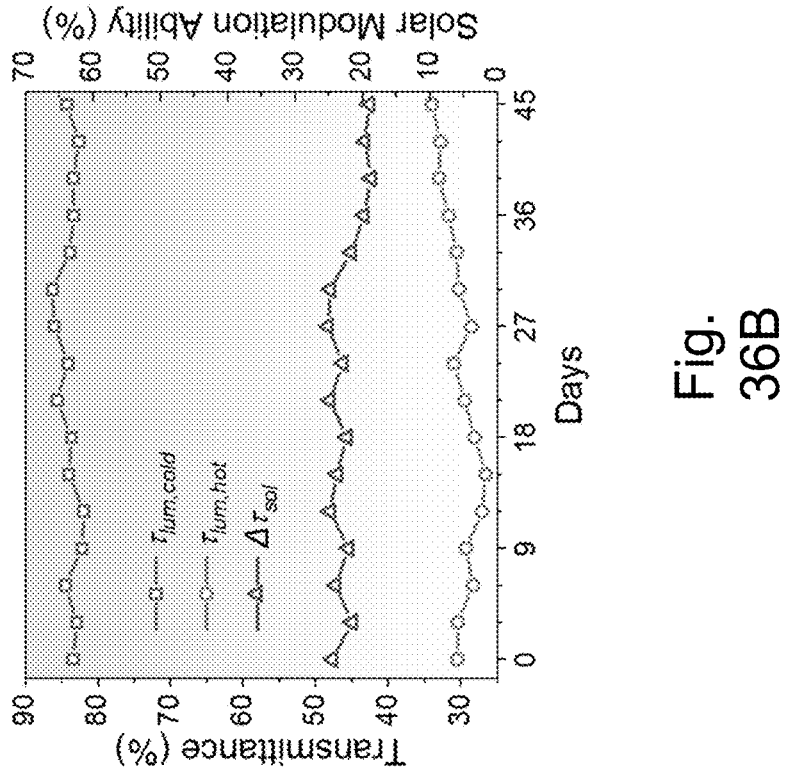
FIG. 36A shows the optical performance ($\tau_{lum,hot}$, $\tau_{lum,cold}$ and $\Delta\tau_{sol}$) of the pristine TPW in the ambient environment (at 23° C. and 60% RH)
Figure 37B:
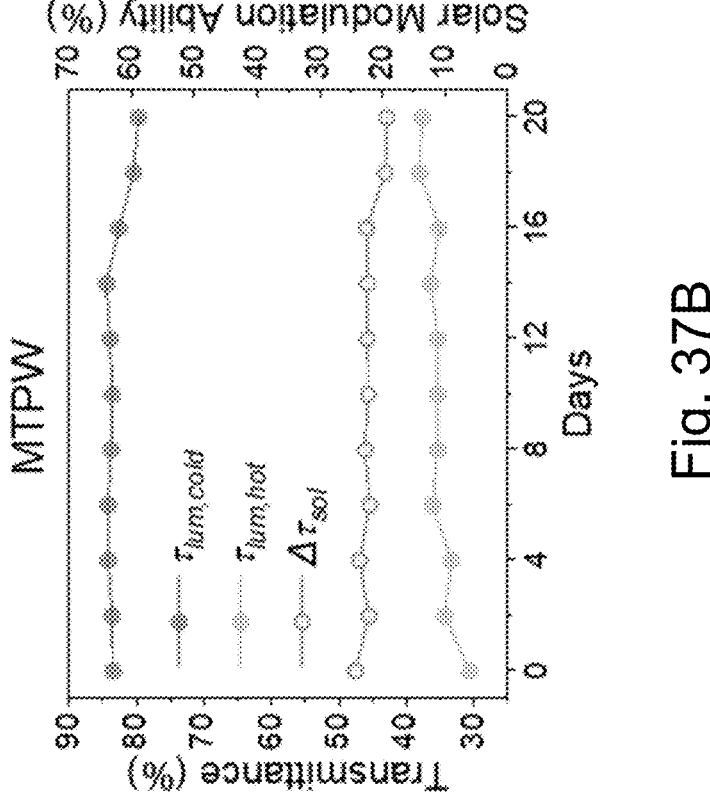
Figure 37A:
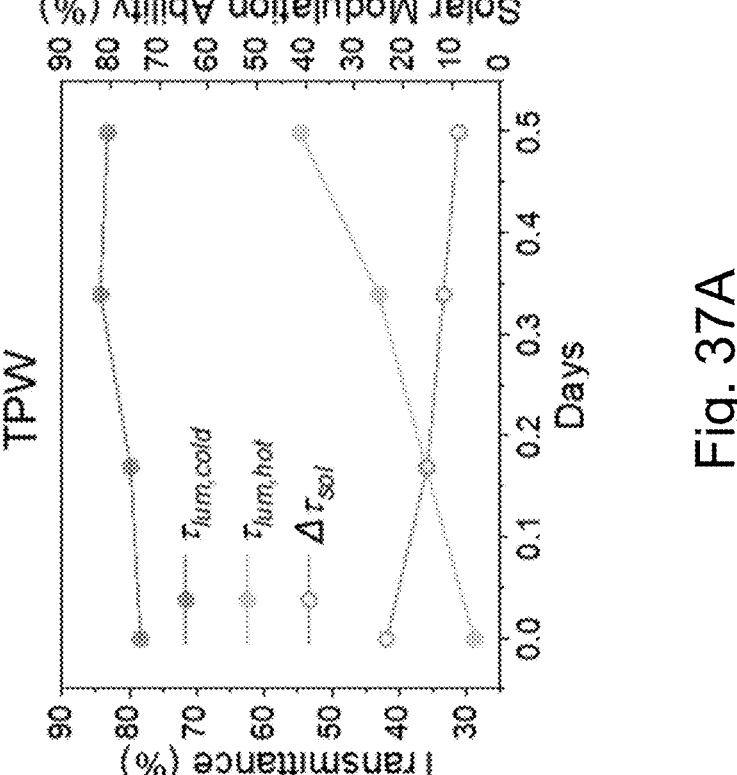
Figure 38B:
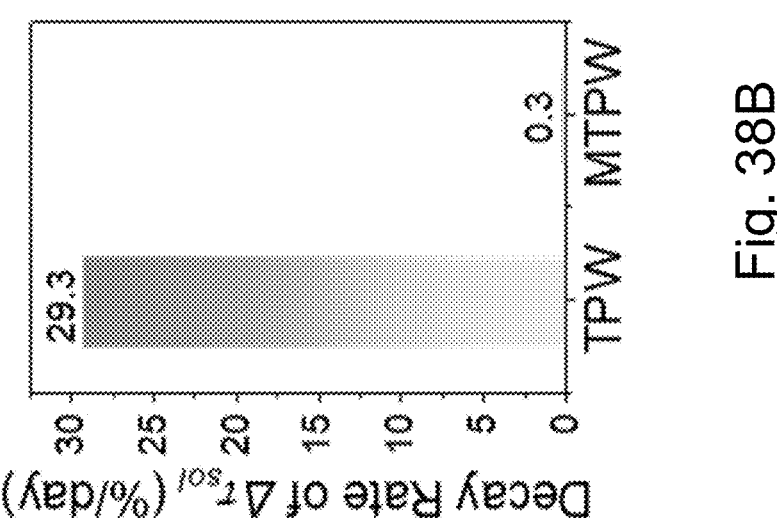
Figure 38A:
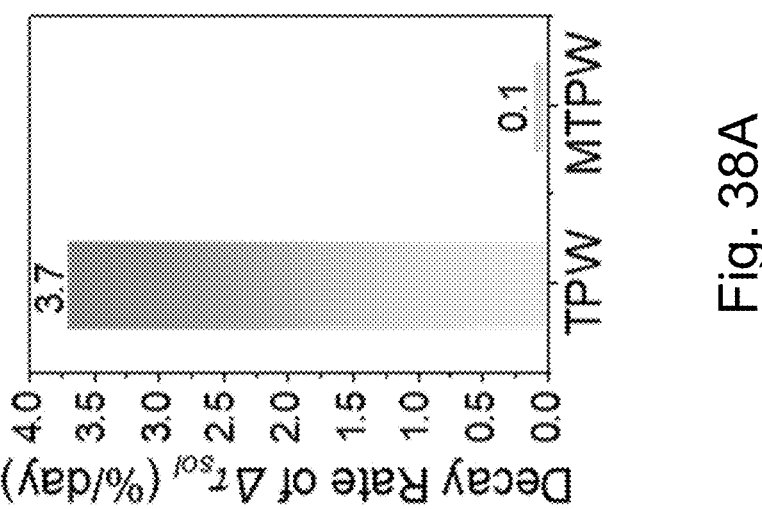
Figure 39C:
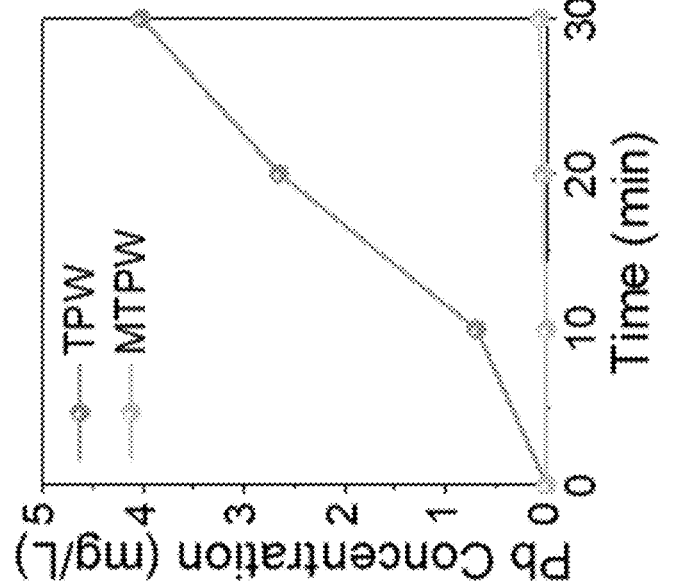
Figure 41:
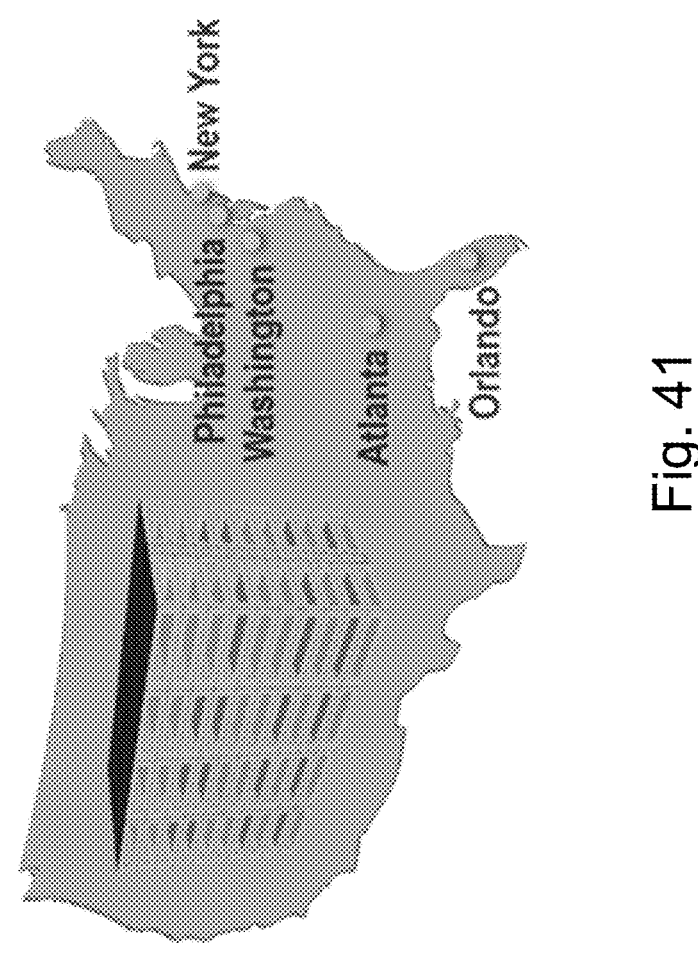
Figure 46:
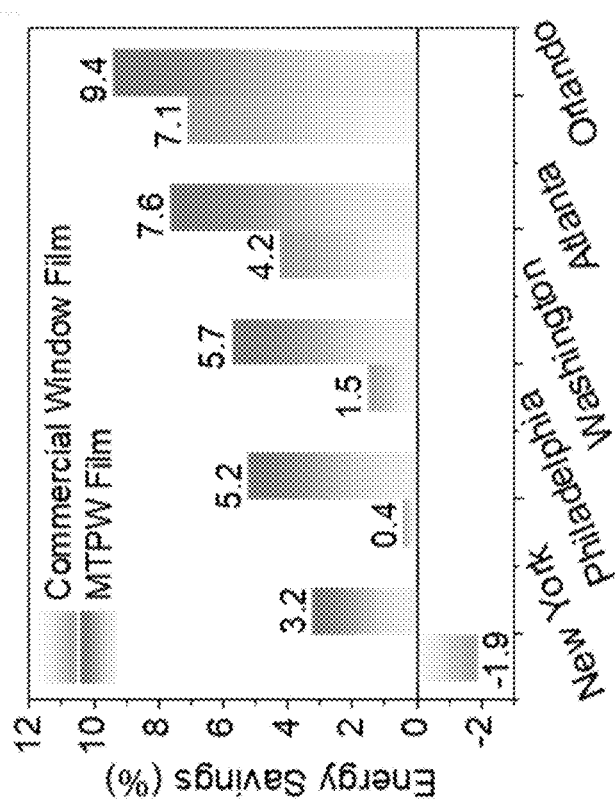
Figure 47:
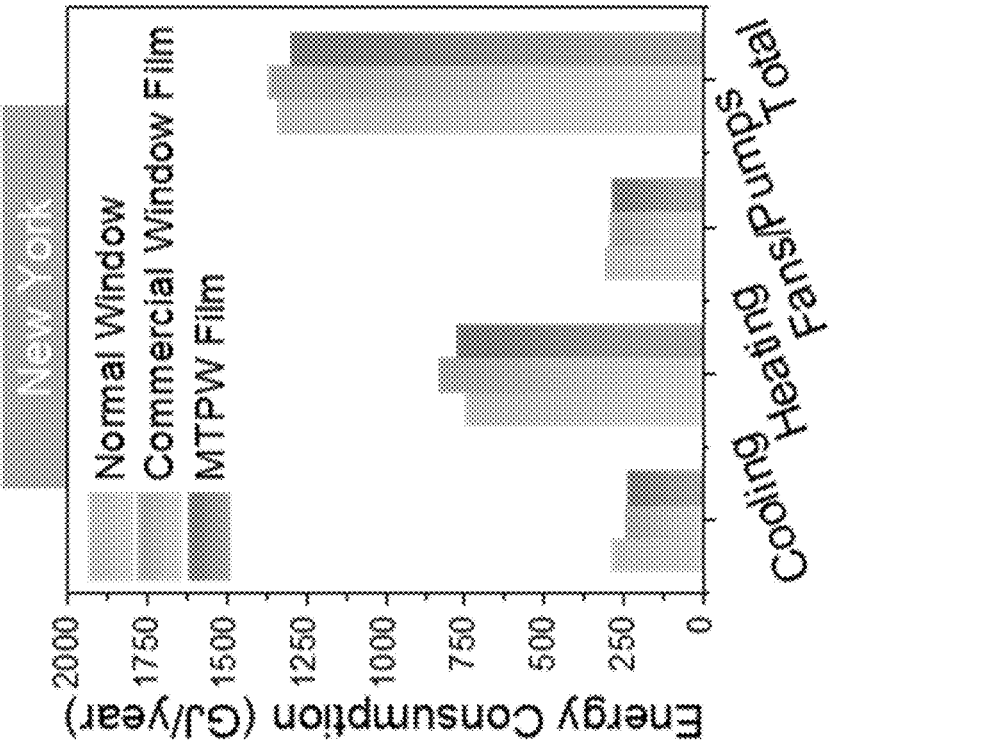
Figure 48:
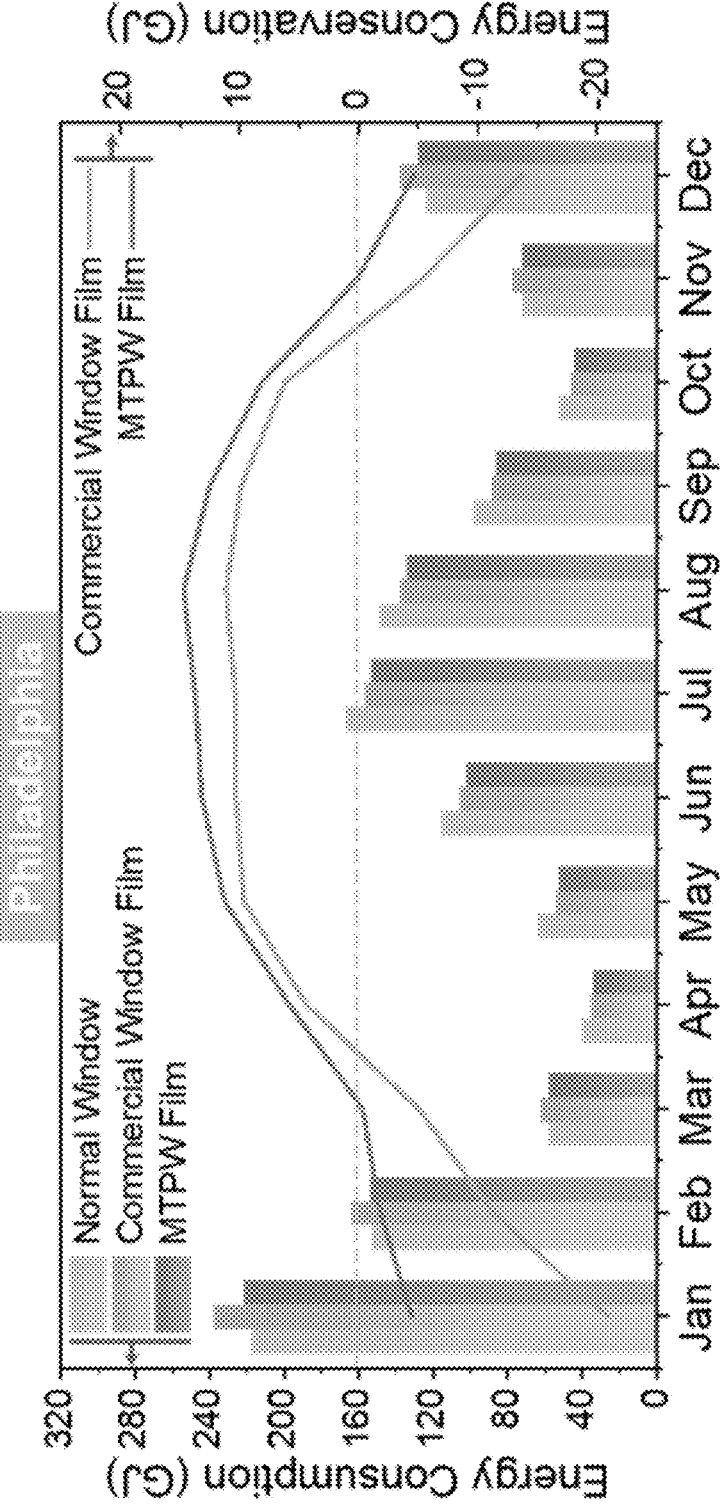
Figure 49:
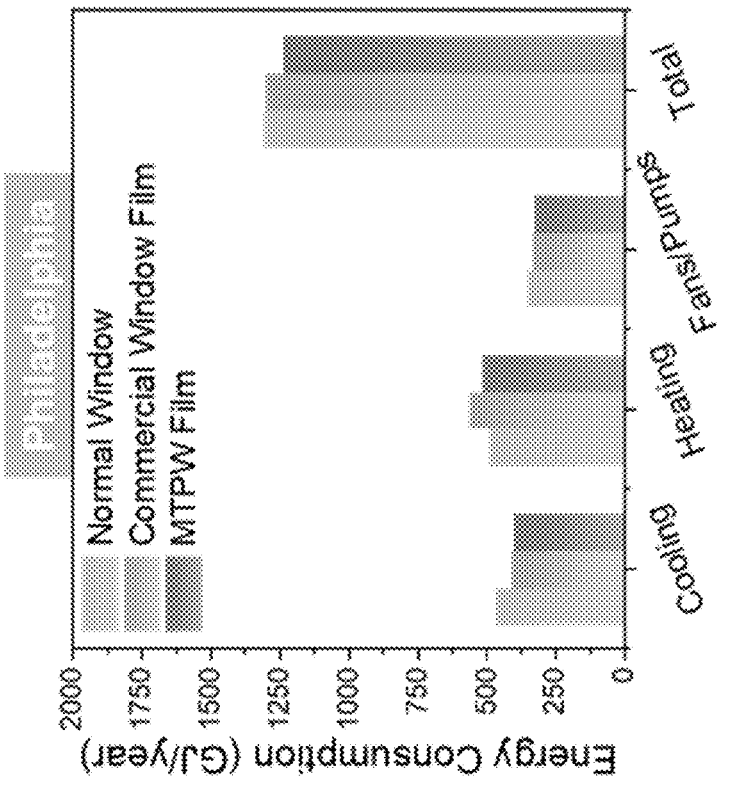
Figure 50:
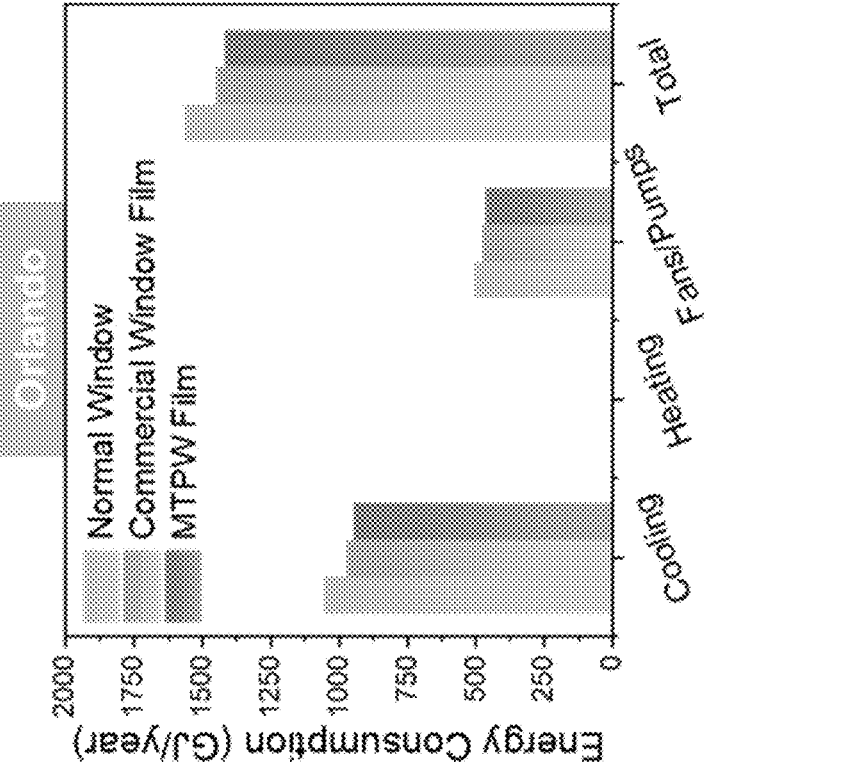
Figure 51:
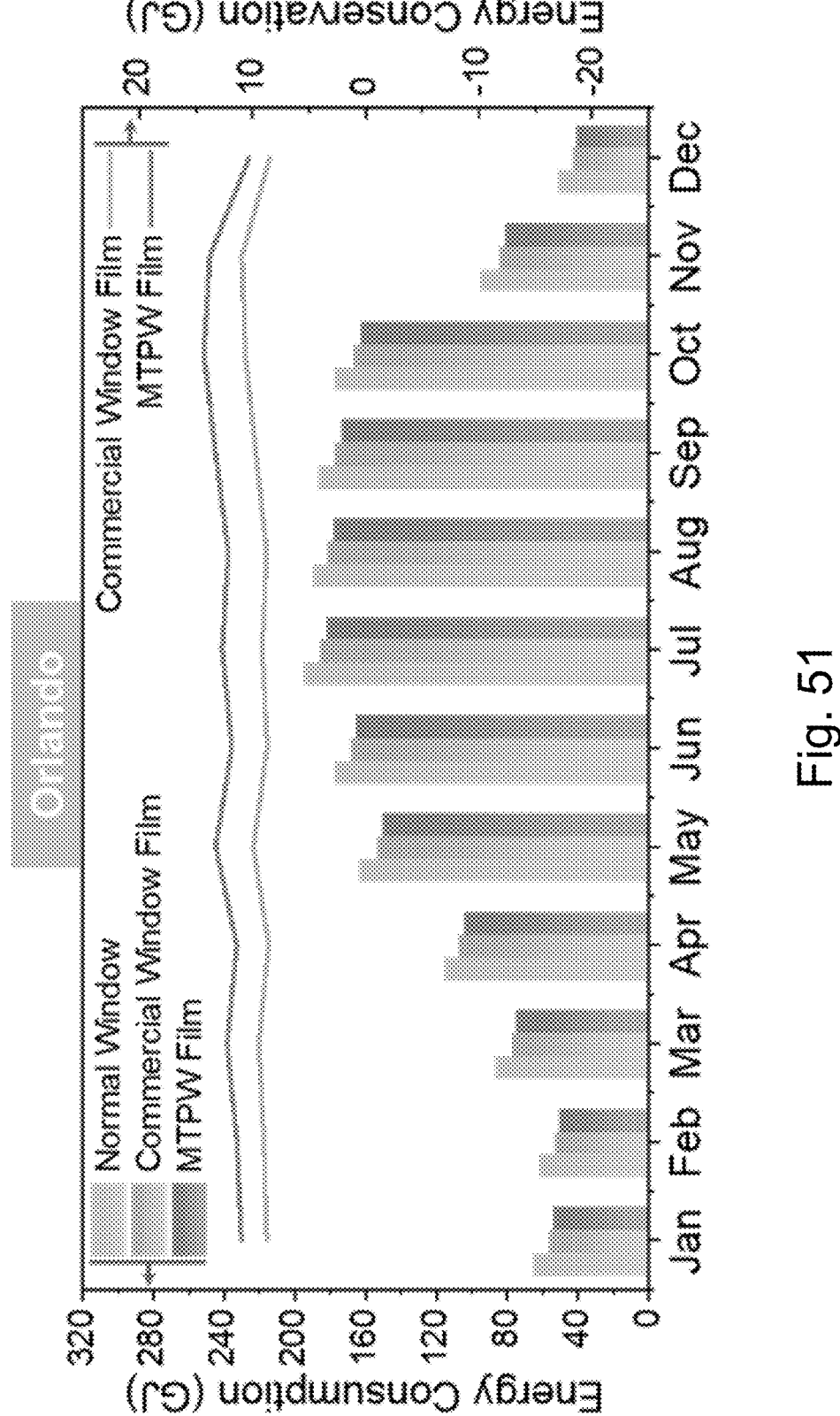

FIG. 36B shows the optical performance ($\tau_{lum,hot}$, $\tau_{lum,cold}$ and $\Delta\tau_{sol}$) of the pristine MTPW in the ambient environment (at 23° C. and 60% RH);

FIG. 37A shows the optical performance ($\tau_{lum,hot}$, $\tau_{lum,cold}$ and $\Delta\tau_{sol}$) of the pristine TPW in the hot and humid environment (at 35° C. and 80% RH);

FIG. 37B shows the optical performance ($\tau_{lum,hot}$, $\tau_{lum,cold}$ and $\Delta\tau_{sol}$) of the pristine MTPW in the hot and humid environment (at 35° C. and 80% RH);

FIG. 38A shows the decay rate of $\tau_{sol}$ of for the TPW and MTPW in the ambient environment;

FIG. 38B shows the decay rate of $\tau_{sol}$ for the TPW and MTPW in the hot and humid environment;

FIG. 39A shows immersion of the pristine TPW and MTPW in water;

FIG. 39B shows the XRD pattern of a pristine T-Perovskite thin film immersed in water. The main observed peaks are in accordance with those of $PbI_2$;

FIG. 39C shows the Pb concentration in the soaking water for the pristine TPW and MTPW corresponding to FIG. 39A;

FIG. 40A shows the photographs of the flexible MTPW film at the cold and hot states;

FIG. 40B shows the photographs of the commercial energy-saving window film;

FIG. 40C shows the transmittance spectra of the commercial window film and MTPW film;

FIG. 41 is a schematic diagram illustrating the locations of New York, Philadelphia, Washington, Atlanta and Orlando as well as the building model used in the Energy-Plus simulation;

FIG. 42 is a table summarizing the information of the building used in the EnergyPlus simulation;

FIG. 43 is a schematic diagram illustrating the window structures (normal window, commercial window film pasted on the window, and MTPW window film pasted on the window) in the EnergyPlus simulation;

FIG. 44 is a table summarizing the optical information of the windows used in the EnergyPlus simulation;

FIG. 45 is a table summarizing the climate information for cities in America used in the EnergyPlus simulation;

FIG. 46 shows energy savings over a year obtained by using the MTPW and a commercial window film compared with a normal window;

FIG. 47 shows building energy consumption when using the normal window, MTPW film and commercial window film in New York;

FIG. 48 shows the monthly energy consumption and savings in Philadelphia;

FIG. 49 shows the energy consumption when using the normal window, MTPW film and commercial window film in Philadelphia;

FIG. 50 shows the energy consumption when using the normal window, MTPW film and commercial window film in Orlando; and FIG. 51 shows the monthly energy consumption and savings in Orlando.

DETAILED DESCRIPTION OF OPTIONAL EMBODIMENT

As used herein, the forms "a", "an", and "the" are intended to include the singular and plural forms unless the context clearly indicates otherwise.

The words "example" or "exemplary" used in this invention are intended to serve as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "of" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Without intending to be limited by theory, the inventors have, through their own research, trials, and experiments, devised a composite material, in particular a thermochromic composite material, with significant haze reduction, enhanced durability/lifespan under ambient humid conditions (e.g., at an ambient temperature with about 60% humidity) and reduced lead leakage. The thermochromic composite material is devised by employing onto the thermochromic perovskite a layer of material comprising an antireflection material and a hydrophobic material, which would reduce light scattering on thermochromic perovskite surface and/or reduce the water vapor/moisture transport rate towards the thermochromic perovskite, thereby providing both enhanced specular transmittance and durability against water/humidity-related degradation.

Figure 1:
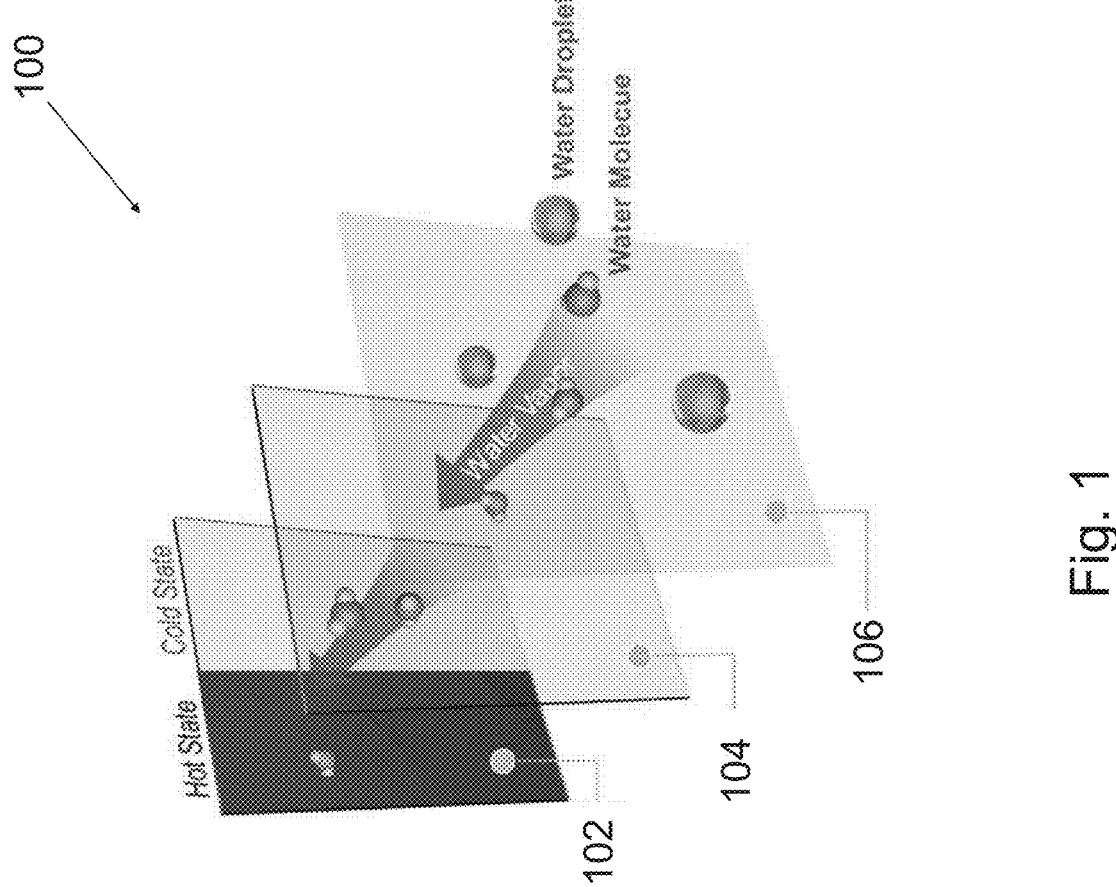
FIG. 1 is a schematic diagram illustrating the composite material in accordance with an embodiment of the present invention.

With reference to FIG. 1, there is provided an exemplary embodiment of a composite material according to the present invention. As shown, there is provided a composite material 100, in particular, a thermochromic composite material 100 comprising a first layer of thermochromic perovskite 102; a second layer of antireflection material 104 comprising an organic or inorganic polymer deposited on the first layer; and a third layer of hydrophobic material 106 deposited on the second layer.

The first layer may comprise a substrate (not shown in the figure) for which a layer of the thermochromic perovskite may be deposited thereon. The material of the substrate may be selected according to practical needs. For example, in an embodiment, the substrate may be a rigid substrate such as a glass substrate. In another embodiment, the substrate may be a flexible substrate such as a polyimide or polyethylene terephthalate PET) substrate.

The thermochromic perovskite may comprise a halide perovskite-based compound having a general formula of $A_4BX_6 \cdot 2H_2O$, with A being a monovalent organic cation, B being a bivalent cation, and X being one or more of a halide. The term "thermochromic perovskite" generally denotes that the perovskite is arranged to undergo a chemical and/or phase change/transition in response to an external temperature change particularly to an extent exceeding or falling below a critical transition temperature of the perovskite. In particular, such chemical and/or phase change/transition would accompany with at least a change of, for example, luminous transmittance, color and the like. For example, in this embodiment, the halide perovskite-based compound $A_4BX_6 \cdot 2H_2O$ may be reversibly changed to $ABX_3$, such as by way of a hydration-dehydration process, in response to a temperature change. Such change of chemical composition may bring the thermochromic perovskite from transparent state to a colored state.

In an embodiment, the halide perovskite-based compound having a general formula of $A_4BX_6 \cdot 2H_2O$ may be with A being selected from any one of $$CH_3NH_3+ \text{ (MA)}$$

and $$CH(NH_2)_2+ \text{ (FA)};$$

B being selected from any one of $Pb^{2+}$, $Sn^{2+}$, $Ge^{2+}$, $Mg^{2+}$, and $Ca^{2+}$; and X being selected from any one of $I^-$, $Br^-$, $Cl^-$ and a combination thereof. In an example embodiment, the halide perovskite-based compound may have a general formula of $(CH_3NH_3)_4PbI_{6-x-y}Br_xCl_y \cdot 2H_2O$, with x and y each being 0 or a positive integer, and $x+y \leq 6$. That said, x and y each may be 0 to 6, with $x+y \leq 6$. In a specific embodiment, the halide perovskite-based compound may be $(CH_3NH_3)_4PbI_{6-y}Cl_y \cdot 2H_2O$, with y being 0 to 6.

It is appreciated that the thickness of the thermochromic perovskite layer may affect the optical properties such as luminous transmittance of the composite material. In an embodiment, the layer of thermochromic perovskite may have a thickness of about 1.4 µm to about 1.8 µm, about 1.4 µm to about 1.7 µm, about 1.5 µm to about 1.7 µm, about 1.6 µm to about 1.8 µm, or about 1.6 µm to about 1.7 µm. Preferably, the layer of thermochromic perovskite may have a thickness of about 1.6 µm.

As mentioned, the second layer of antireflection material 104 may comprise an organic or inorganic polymer deposited on the first layer 102. The term "antireflection material" as used herein generally describes a material particularly a polymer and more particularly an organic and/or inorganic polymer(s) arranged to reduce reflection and/or light scattering from the surface of thermochromic perovskite layer. In particular, the antireflection material may be arranged to reduce the reflection by way of, for example, providing a substantially smooth surface on the thermochromic perovskite layer and/or having a refractive index (n) that matches with the air-thermochromic perovskite layer interface. In an example embodiment, the antireflection material may have a $R_\alpha$ of about 55 nm. The phrase "match(es)" generally denotes that the refractive index of the antireflection material may be close to or in between the air (n≈1) and the thermochromic perovskite (n≈2). In an example embodiment, the antireflection material may have a refractive index that is in between air and the thermochromic perovskite, which therefore improves the light propagation path tolerance to the surface roughness, reducing the light scattering at the thermochromic perovskite surface boundary. Preferably, the refractive index of the antireflection material may be about 1.5 to about 1.55.

The antireflection material may comprise any one of epoxy, poly(methyl methacrylate), polyvinylpyrrolidone, poly(vinyl alcohol), polydimethylsiloxane, poly(acrylic acid), poly(acrylamide), poly(aniline), poly(ethylene oxide), poly(N-acryloxysuccinimide), poly(N-isopropylacrylamide), poly(N-isopropylmethacrylamide), poly(N-vinylcaprolactam), poly(N-vinylpyrrolidone), poly(methacrylic acid), poly(styrene sulfonic acid), polyurethane, poly(propylene oxide), perhydropolysilazane or a combination thereof.

In an embodiment, the antireflection material may be perhydropolysilazane (PHPS). The terms "perhydropolysilazane", "polyperhydridosilazane" or "inorganic polysilazane" generally denote a kind of polymer in which silicon and nitrogen atoms alternate to form the basic backbone. In particular, the perhydropolysilazane may take the form of a homogenous inorganic film comprising $SiO_x/SiON_x$. The $SiO_x/SiON_x$ film may have a refractive index that is substantially similar to that of common $SiO_2$ (n≈1.5). In addition, it is believed that the $SiO_x/SiON_x$ film formed from the PHPS would be advantageous over the common $SiO_2$ since the deposition of common $SiO_2$ film generally relies on high-vacuum clean-room coating methods such as chemical vapor deposition and physical vapor deposition. These methods require expensive deposition equipment and could only deposit a conformal layer on the rough surface, which is believed to be not helpful in smoothing the surface, particularly the surface of thermochromic perovskite which has a plurality of valleys. In contrast, the PHPS may be deposited by way of solution-based coating process such as spin-coating and spray-coating, which is believed to be effective in reducing the roughness of the thermochromic perovskite surface. Detailed comparison will be disclosed in later part of the present disclosure.

The third layer of hydrophobic material 106 may comprise a superhydrophobic layer. The phrase "superhydrophobic" as used herein refers to a material or surface of such material having a contact angle of water droplet of about 150° or above, such as about 150° to about 200°, about 150° to about 190°, about 155° to about 190°, about 155° to about 180°, about 155° to about 170°, about 155° to about 165°. In an embodiment, the superhydrophobic layer may have a water contact angle of about 160°.

Preferably, the superhydrophobic layer may comprise a layer of fluorinated nanocoating, such as any one of fluorinated $SiO_2$, fluorinated $TiO_2$, and fluorinated ZnO coating. In a specific embodiment, the superhydrophobic layer may comprise a layer of fluorinated $SiO_2$ coating.

Without wishing to be limited by theory, the inventors have devised that by employing the second layer of antireflection material and the third layer of hydrophobic material as described herein onto the first layer of thermochromic perovskite, the thermochromic perovskite would be protected from the bulk water such as water droplet but allowing a preferred amount of water vapor or moisture to contact with the thermochromic perovskite by reducing the transport rate of the water vapor/moisture. As such, the water vapor/moisture may support the thermochromism (i.e., the hydration-dehydration process of the thermochromic perovskite as described herein) to proceed but trigger the water/humidity-related degradation as described herein at a minimal level. Thus, it is believed that durability of the composite material as described herein would be enhanced as compared with typical thermochromic perovskite material. For example, in a specific embodiment, the composite material as described herein may maintain a solar modulation ability above 20% during a 45-day aging test, with a decay rate 37 times lower than that of a pristine thermochromic perovskite material. Detailed performance of the composite material in accordance with such specific embodiment will be disclosed in later part of the present disclosure.

The method for preparing the composite material as described herein will now be disclosed. The method may commence with the step of coating a thermochromic perovskite on a substrate being made of glass or PET to form a first layer. In particular, the coating step may be a solution-based coating method which involves spin-coating or blade-coating a layer of thermochromic perovskite precursor onto the substrate. In particular, the thermochromic perovskite precursor may be prepared by mixing AX and $BX_2$, with A being a monovalent organic cation, B being a bivalent cation, and X being one or more of a halide as defined herein, in a molar ratio of about 4:1 to about 7:1 in a solvent such as dimethylformamide (DMF) or dimethyl sulfoxide (DMSO), followed by stirring at a temperature of about 50° C. to about 60° C. for about 1 hour.

In an embodiment where the thermochromic perovskite is $(CH_3NH_3)_4PbI_{6-y}Cl_y \cdot 2H_2O$, with y being 0 to 6 as defined herein, its precursor may be prepared by mixing $CH_3NH_3I$ and $PbCl_2$ in a molar ratio of about 6.5:1 in DMF. The mixture may then be stirred at a temperature of about 50° C. for about 1 hour. After that, the halide perovskite-based precursor of $(CH_3NH_3)_4PbI_{6-y}Cl_y \cdot 2H_2O$ may be spin-coated onto the glass or PET substrate, with a spin speed of about 2000 rpm for about 1 hour.

Optionally, the substrate may be subjected to cleaning with suitable reagents or solvent such as detergent, ethanol, deionized water, etc. and/or with a plasma cleaner.

After the thermochromic perovskite is coated onto the substrate, the thermochromic perovskite may be subjected to annealing. The annealing step, in particular, may facilitate the removal (evaporation) of residual solvent of the precursor. In the aforementioned embodiment where the solvent is DMF, the annealing process may be performed at about 100° C. for about 1 hour.

The next step of the present method may be coating an antireflection material on the first layer to form a second layer. In particular, the coating step may be a solution-based coating method which involves spin-coating or blade-coating a layer of antireflection material onto the substrate. The antireflection material may comprise a homogenous inorganic material that is solidified by curing after being spin-coated or blade-coated on the first layer. For example, in an embodiment where the antireflection material is perhydropolysilazane, the homogenous inorganic material may be formed by dissolving the perhydropolysilazane, such as with an amount of 20 wt. %, in a solvent such as dibutyl ether to form a precursor solution. The precursor solution may then be spin-coated or blade-coated onto the first layer of thermochromic perovskite. After that, the coated precursor solution may be solidified by curing the precursor solution at a temperature of about 100° C. for about 2 hours. As such, a layer of homogenous inorganic material of $SiO_x/SiON_x$ may be formed on the first layer of thermochromic perovskite.

The method finally may proceed to the step of coating a silica-based nanoparticles on the second layer to form a third layer. Similar to the previous two coating steps as described above, the coating step for the silica-based nanoparticles is a solution-based coating method, but preferably is an ultrasonic spray-coating. It is believed that the ultrasonic spray-coating method is advantageous in the following aspects: 1) compared to other coating methods, such as spin-coating and dip-coating, spray-coating could produce large-area thin films with excellent uniformity; and 2) simultaneously with coating the silica-based nanoparticle solution, the ultrasonic machine could atomize the solvent in the silica-based nanoparticle solution, minimizing the damage to the thermochromic perovskite induced by any functional group of the solvent (e.g., —OH group of ethanol).

For example, in an embodiment where the silica-based nanoparticles may be $SiO_2$ nanoparticles, particularly fluorinated $SiO_2$ nanoparticles, the nanoparticles may be deposited on the second layer by coating a solution of the $SiO_2$ nanoparticles, such as an ethanol solution of the $SiO_2$ nanoparticles by way of ultrasonic spray-coating method using an ultrasonic spray-coating machine. In particular, the ultrasonic spray-coating machine may atomize the solvent in the $SiO_2$ nanoparticle solution simultaneously upon coating the solution. Optionally or additionally, the sample stage of the machine, on which the composite material comprising the first and the second layers as described above is placed, may be set to a preferred temperature to further facilitate the evaporation of solvent on the second layer. It is appreciated that the preferred temperature may vary depending on the solvent used in the $SiO_2$ nanoparticle solution. For example, in an embodiment where the solvent is ethanol, the temperature of the sample stage may be about 50° C. to about 60° C.

Hereinafter, the present invention is described more specifically by way of examples, but the present invention is not limited thereto.

EXAMPLES

Materials and Chemicals $CH_3NH_3I$ (MAI, 99.5%) was provided by Xi'an Polymer Light Technology. $PbCl_2$ (99%) was purchased from Sigma-Aldrich. Dimethylformamide (DMF, ≥99.5%) was purchased from Alfa Aesar. PHPS was supplied by Iota Silicone Oil. The fluorinated $SiO_2$ nanoparticle/ethanol solution was provided by Solmont Tech.

Methods and Characterization

Characterization and Measurements

The FTIR spectrum of PHPS was obtained by a Perkin-nElmer Spectrum 3. The SEM images and energy-dispersive X-ray spectroscopy (EDS) mappings of the samples were obtained by a FEI Quanta 450. Transmission electron microscopy (TEM, 2010F, Jeol) was used to characterize the size of the $SiO_2$ nanoparticles.

The transmittance spectra were obtained by a UV-Vis-NIR spectrophotometer from 300 nm to 2500 nm (Lambda 1050, Perkin Elmer equipped with a 150 mm integrating sphere detector). A tailor-made temperature controller (including a heater, a T-type thermocouple, and a temperature controller) was attached to the window sample to control the temperature while measuring the transmission at both the cold (25° C.) and hot (60° C.) states.

The luminous transmittance ($T_{num}$) of each window was calculated by $$\tau_{lum} = \frac{\int_{\lambda=380\,nm}^{780\,nm} \bar{y}(\lambda)\tau(\lambda)d\lambda}{\int_{\lambda=380\,nm}^{780\,nm} \bar{y}(\lambda)d\lambda}$$

to quantify the amount of transmitted visible light, where $\tau(\lambda)$ is the transmittance of the window at wavelength $\lambda$. $\bar{y}(\lambda)$ is the photopic luminous efficiency of the human eye defined by the CIE (International Commission on Illumination) standard.

The total solar transmittance is defined as transmittance $$\tau_{sol} = (\tau_{sol} = \frac{\int_{\lambda=300\,nm}^{2500\,nm} AM_{1.5}(\lambda)\tau(\lambda)d\lambda}{\int_{\lambda=300\,nm}^{2500\,nm} AM_{1.5}(\lambda)d\lambda},$$

where $AM_{1.5}(\lambda)$ is the AM1.5 G solar irradiance spectrum). $\Delta\tau_{sol}$ was calculated by $$\Delta\tau_{sol} = \tau_{sol}^{cold} - \tau_{sol}^{hot}.$$

Following ASTM D1003 "Standard Method for Haze and Luminous Transmittance of Transparent Plastics", the haze was calculated as $$haze = \left(\frac{T_4}{T_2} - \frac{T_3}{T_1}\right) \times 100\%,$$

where $T_1$ is the incident light, $T_2$ is the total light transmitted by the sample, $T_3$ is the light scattered by the equipment, and $T_4$ is the light scattered by the sample and equipment. The roughness of the samples was measured by 3D surface metrology (Bruker NPFLEX).

To measure the transition temperature $T_c$ of the T-Perovskite, a heating and cooling cycle was conducted for the samples on a high-precision temperature-controlled hot plate (CHEMAT 4AH) between room temperature and 60° C. at intervals of 2° C. For each temperature set point, the samples were kept on the hot plate for 5 min to ensure the stability of the color. At the same time, the transmittance at 550 nm was measured by a Lens Transmission meter (SDR8508). Then, $T_c$ was calculated by plotting the first derivative of the transmittance with respect to the temperature as a function of temperature, where $T_c$ is the minimum value point of the first derivative. The transition time was measured by observing the tinting and color fading of smart windows in the heating and cooling processes at the corresponding transition temperature point.

The water CA and sliding angle measurements were performed by means of a static CA meter (Biolin Theta), and 4 µL water droplets were dripped on each test surface. To conduct the durability test, the pristine T-Perovskite window (TPW) and mask-inspired thermochromic perovskite smart window (MTPW) were placed in an enthalpy testing chamber, and the conditions of the enthalpy testing chamber were set to 23° C./60% RH and 35° C./80% RH to mimic the ambient environment and a hot and humid environment, respectively. The sample was heated and cooled once a day. In the hot condition, the sample was kept at the transition point to mimic its colored state in realistic scenarios. The transmittance of the sample at the cold and hot states was measured to judge the stability of the T-Perovskite.

Figure 2:
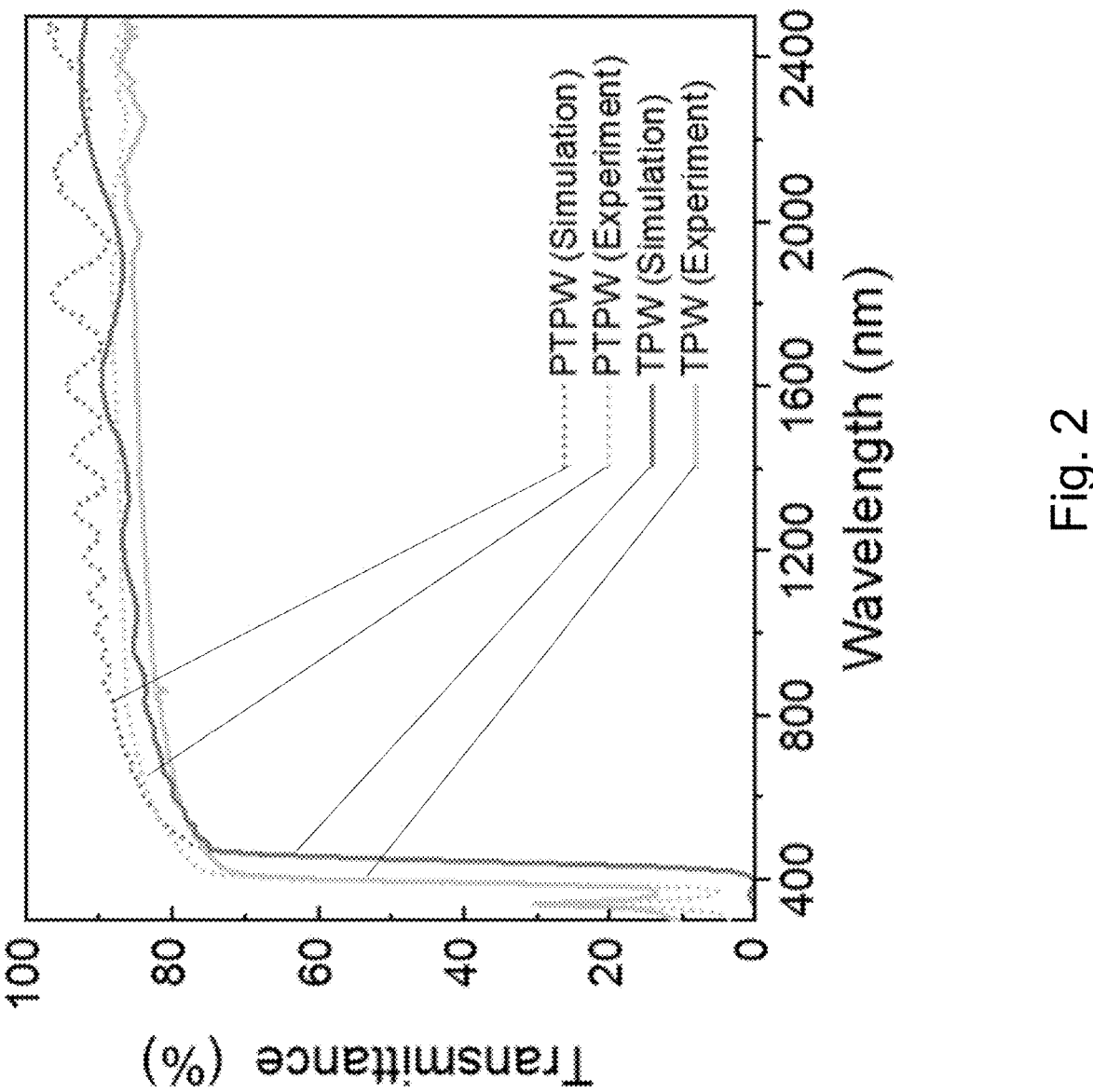
FIG. 2 shows the transmittance spectra from FDTD simulations and experiments to verify the FDTD model. This figure also shows that the transmittance of the PHPS-coated T-Perovskite window (PTPW) is higher than that of the pristine T-Perovskite window (TPW) in both the simulated and experimental results.

For the Pb leakage test, the Pb concentration in the contaminated water was detected by an ICP-MS instrument (Perkin Elmer 2000). To conduct the FDTD simulation, the refractive indices of PHPS and $$H - MAPbI_{3-x}Cl_x (MA = CH_3NH_{3}+)$$

at the cold and hot states were measured by an ellipsometer (J. A. Woollam RC2). In the FDTD simulation (Lumerical software), to obtain the reflection and transmission spectra of the window in the wavelength range of 0.3-2.5 µm, a plane wave was placed on top as the light source. The rough $H-MAPbI_{3-x}Cl_x$ and PHPS layers were created based on the roughness measured by 3D surface metrology. The boundary conditions along the z-direction were defined as perfectly matched layers (PMLs), while symmetric boundary conditions were applied for the x- and y-directions. To verify the accuracy of the FDTD model, the simulated transmittances of the TPW and PTPW were compared with the experimental results, and their similar transmittance spectra, as shown in FIG. 2, prove the reliability of the FDTD model. Additionally, the scattering cross-section of a single $SiO_2$ nanoparticle was simulated to calculate its scattering efficiency. A total-field scattered field (TFSF) source was utilized as the incident light, and the boundary conditions along the x-, y-, and z-directions were all defined as PMLs. The mesh sizes were 0.5 nm. The output from the FDTD simulation was the scattering cross-section ($C_{sca}$) of a spherical particle, and the scattering efficiency coefficient ($Q_{sca}$) was $C_{sca}$ normalized as $$Q_{sca} = \frac{C_{sca}}{\pi r^2},$$

where $\pi r^2$ is the geometrical cross-sectional area of the scattering particle.

Example 1

Fabrication of Mask-Inspired Thermochromic Perovskite Smart Window (MTPW)

Figure 3:
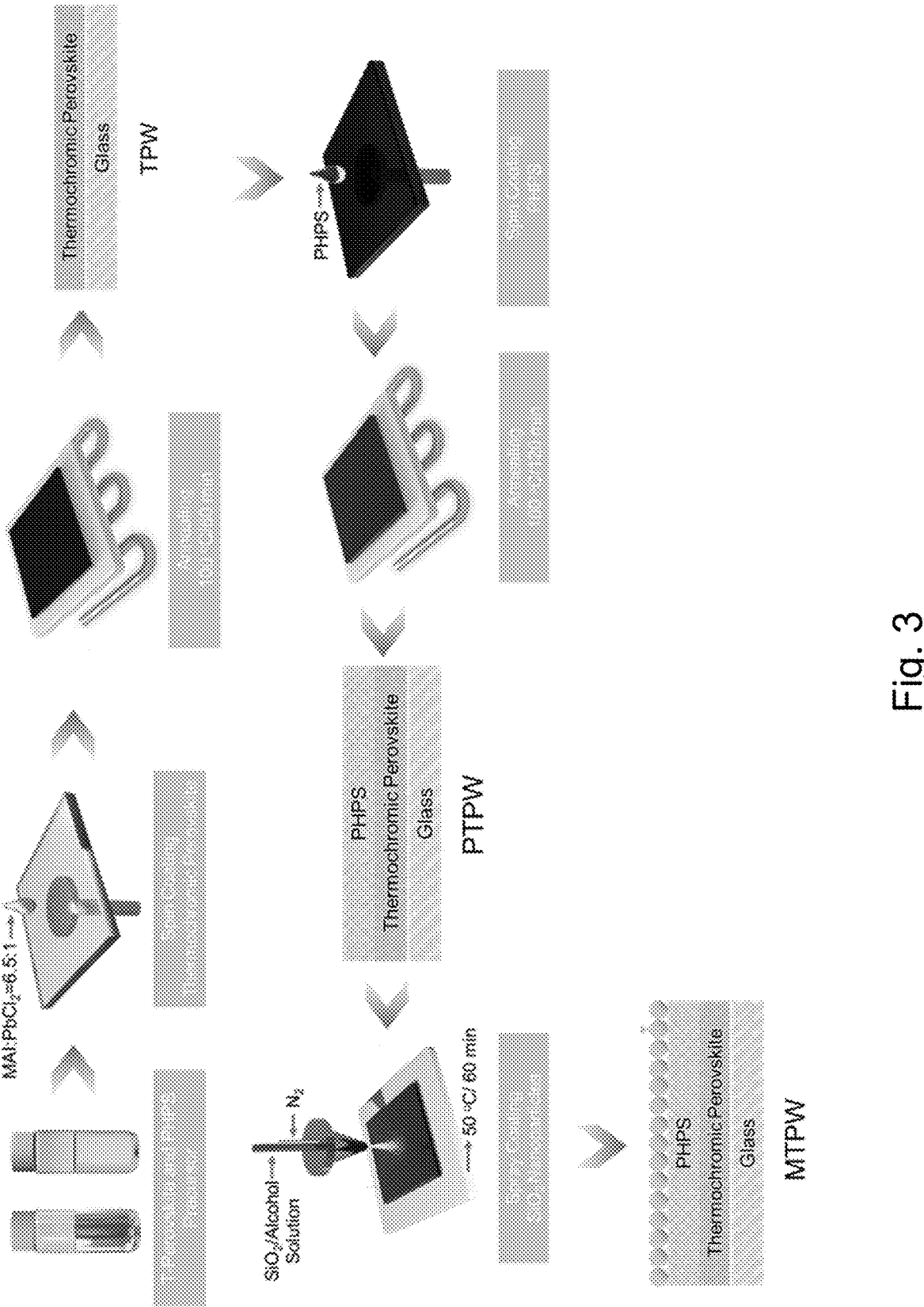
FIG. 3 is a schematic diagram illustrating the fabrication of process of mask-inspired thermochromic perovskite smart window (MTPW)

The synthetic scheme of the MTPW is illustrated in FIG. 3. As shown, an all-solution-based coating method was employed for the fabrication.

Specifically, glass substrates were cleaned with detergent, ethanol, and deionized (DI) water in an ultrasonic bath for 15 min, followed by drying with $N_2$. The glass substrates were further cleaned in a plasma cleaner (FARI GD-5) for 200 s. The $H-MAPbI_{3-x}Cl_x$ precursor $$(MA = CH_3NH_3^+)$$

was synthesized by mixing MAI ($CH_3NH_3I$) and $PbCl_2$ at a molar ratio of 6.5:1 in DMF solvent, followed by stirring at 50° C. for 1 hour. The $H-MAPbI_{3-x}Cl_x$ precursor was spin-coated on the glass by a spin coater (Laurell H6-23) at 2000 rpm for 15 s, followed by annealing at 100° C. for 1 hour to evaporate the residual DMF, forming a 1.6 µm-thick T-Perovskite film (FIG. 4A). The sample obtained at this stage is referred as T-Perovskite window (TPW).

Figure 4B:
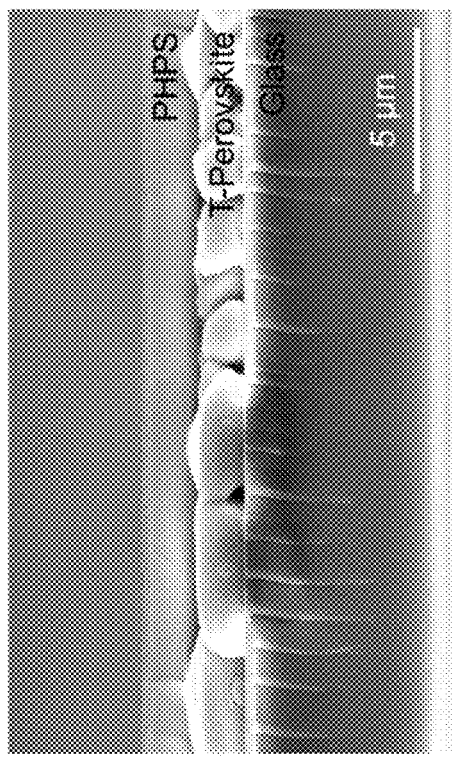
FIG. 4B is a cross-sectional SEM image of PHPS coated on the T-Perovskite.
Figure 4A:
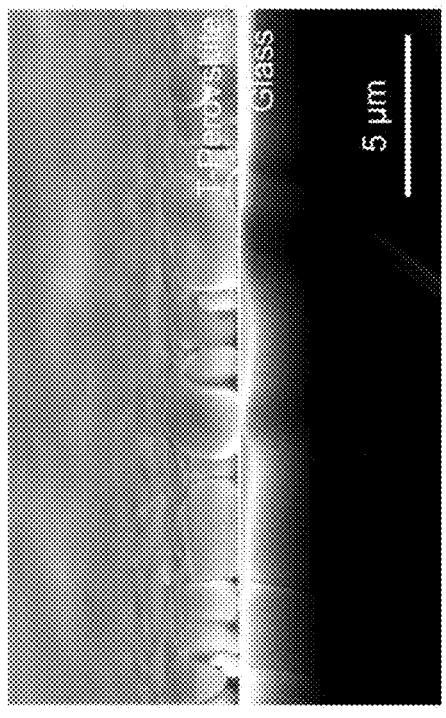
FIG. 4A is a cross-sectional SEM image of T-Perovskite coated on glass.
Figure 5:
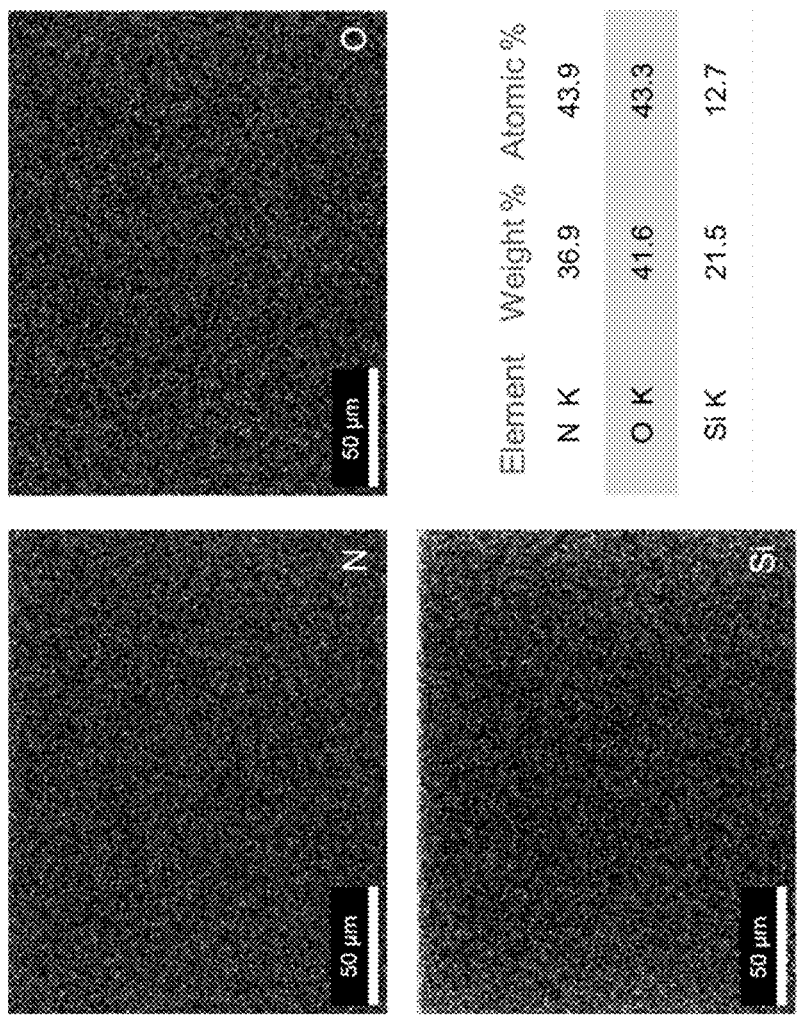
FIG. 5 shows the EDS analysis of the PHPS film.
Figure 6:
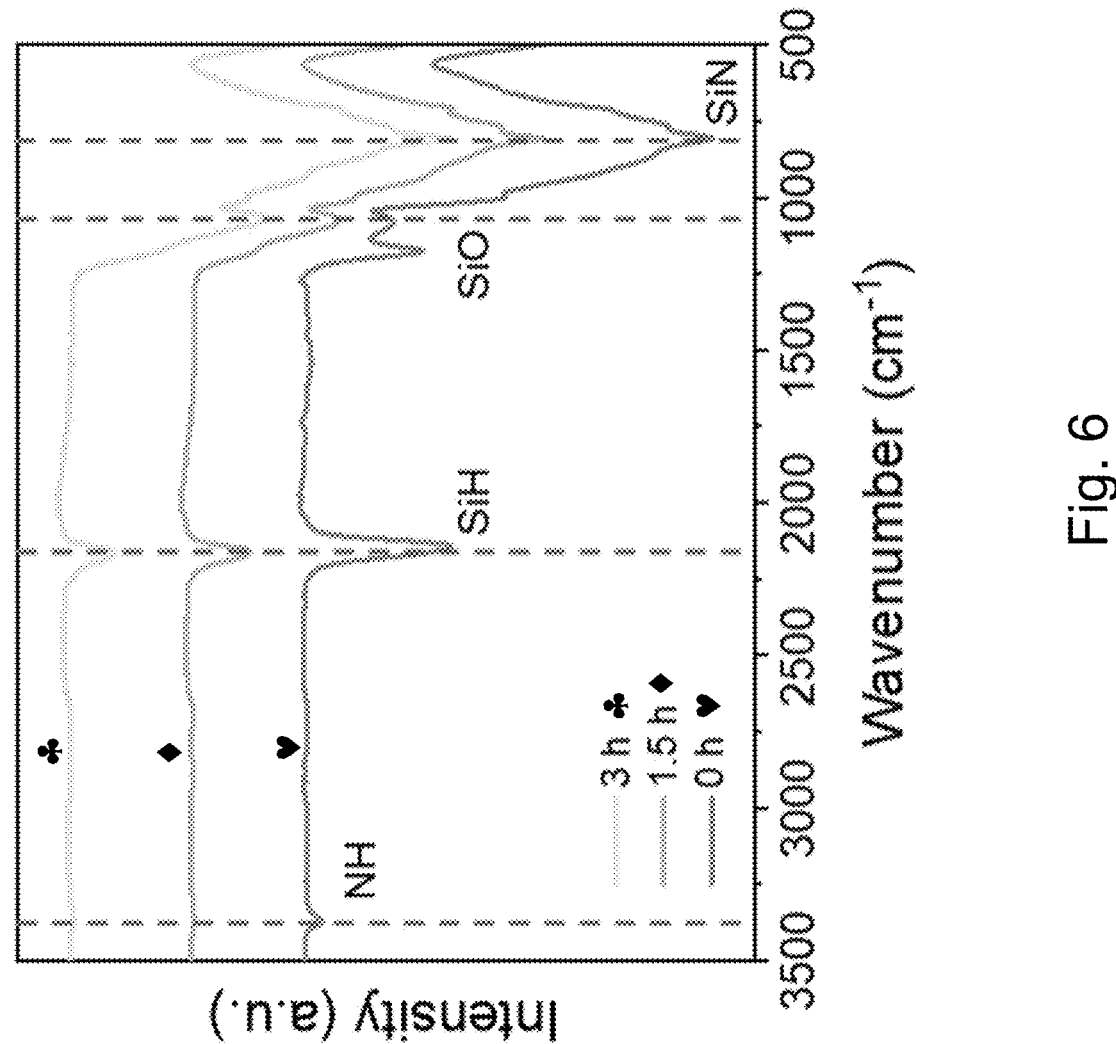
FIG. 6 shows the FTIR spectra of the PHPS in the curing process.

Then, 20 wt % PHPS in dibutyl ether (a nontoxic and nonpolar solvent with a low dielectric constant of 3.1) solution was spin-coated on the T-Perovskite layer at 500 rpm for 15 s, and the sample was cured in air at 100° C. for 2 hours (FIG. 4B). The moisture and oxygen in the air caused cleavage of the Si—N bond in PHPS, and PHPS was gradually converted into homogeneous $SiO_x/SiON_x$ (FIG. 5). As shown in FIG. 6, as the curing time increased from 1 to 3 hours, the Fourier transform infrared (FTIR) peaks corresponding to the N—H ($3400 \text{ cm}^{-1}$), Si—H ($2150 \text{ cm}^{-1}$) and Si—N($830 \text{ cm}^{-1}$) stretching vibrations decreased, while the Si—O peak near $1050 \text{ cm}^{-1}$ increased. The sample obtained at this stage is referred as PHPS-coated T-Perovskite window (PTPW).

Then, the sample was moved to an ultrasonic spray-coating machine (UC 330, Siansonic Technology) to coat the $SiO_2$ nanoparticles. It is believed that the ultrasonic spray-coating method is advantageous in the following aspects: 1) compared to other coating methods, such as spin-coating and dip-coating, spray-coating can produce large-area thin films with excellent uniformity; and 2) the ultrasonic machine can atomize the ethanol solvent of the $SiO_2$ nanoparticle solution, minimizing the damage to the T-Perovskite induced by the —OH group.

Specifically, an ultrasonic spray system (UC 330, Siansonic Technology) equipped with a 45 kHz frequency nozzle (Z402, Siansonic Technology) was used to coat superhydrophobic $SiO_2$ nanoparticles. The samples were placed on the vacuum stage of the spray machine, perpendicular to the spray nozzle. In particular, the vacuum stage was set to 50° C. for further accelerating the evaporation of ethanol on the perovskite surface. The concentration of the $SiO_2$ dispersion was 1 wt. %. Details of the spray-coating parameters, including the flow rate, shaping air pressure, distance between the nozzle tip and substrate, nozzle speed, path width, number of layers, stage temperature, and ultrasonic power, are shown below.

| Parameter: | Value: |
| --- | --- |
| Flow rate | 0.1 ml/min |
| Shaping air pressure | 0.015 MPa |
| Distance between nozzle and sample | 50.0 mm |
| Nozzle speed | 100 mm/s |
| Path width | 4 mm |
| Number of runs | 5/10/15/20/25/50/100/150 |
| Substrate temperature | 50° C. |
| Ultrasonic power | 3.0 W |

The thickness of each layer was controlled by layer-by-layer spray deposition. Layers were deposited in an alternating zigzag path with a 4 mm gap to cover the entire surface. The sample obtained at this stage is referred as MTPW.

Example 2

Characterization of MTPW

Similar to a medical mask, the MTPW also consists of three layers (FIG. 1). The bottom layer is a T-Perovskite film deposited on a glass substrate. To protect the T-Perovskite and maintain a high window transparency, a transparent protection buffer layer is adopted to control the amount of water vapor on the T-Perovskite, and the top layer is a superhydrophobic layer to effectively repel liquid water droplets. In this way, the T-Perovskite window as if wearing a mask that allows it to "breathe" a right amount of water vapor to trigger thermochromism, but blocking excess water vapor and water droplets, thus improving its durability. Photographs of the MTPW are shown in FIG. 7. It is highly transparent at the cold state and becomes reddish brown at the hot state, and this thermochromic effect is found to be reversible.

As shown, hydrated $MAPbI_{3-x}Cl_x$ ($H-MAPbI_{3-x}Cl_x$ or $MA_4PbI_{6-x}Cl_x \cdot 2H_2O$ or $(CH_3NH_3)_4PbI_{6-y}Cl_y \cdot 2H_2O$ of the present invention) is selected as the T-Perovskite owing to its large $\Delta\tau_{sol}$ (>20%), low $T_c$ (<45° C.) and short t(<2 min).

It is believed that the protection buffer layer shall be selected based on the following criteria: 1) the layer must be highly transparent; 2) the material should be stable and resistant to harsh environments; and 3) the protection buffer layer should have an n between that of the perovskite and the air to minimize the surface reflection.

Figure 9:
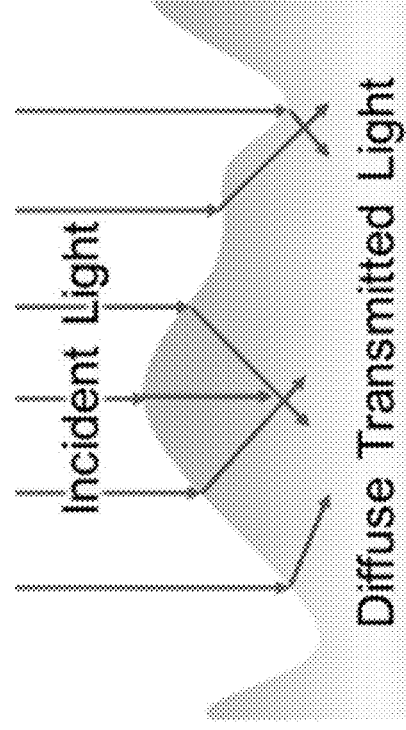
FIG. 9 is a schematic diagram illustrating light transmission through a rough surface.

Based on the above criteria, $SiO_2$, an inorganic oxide with an refractive index (n) of approximately 1.5 (c.f. the $H-MAPbI_{3-x}Cl_x$ perovskite which has n≈2.0 for visible wavelengths at the cold state and is even higher at the hot state, FIG. 8) is selected as the protection buffer layer. Meanwhile, it is appreciated that T-Perovskite may possess a rough surface which influences the light propagation path, leading to diffuse transmission, and therefore resulting in high haze (FIG. 9). As such, in addition to the above three criteria, the ability of the $SiO_2$ forming a smooth surface on the T-Perovskite should be considered.

Typical $SiO_2$ coating relies on high-vacuum clean-room coating methods, such as chemical vapor deposition and physical vapor deposition. These methods, however, require expensive deposition equipment and are only applicable to deposit a conformal layer on the rough surface, which is not helpful in filling the valleys to form smooth surface (FIGS. 10A and 10B). As shown in FIG. 10B, left, the rough surface implies that sputtering method is unable to improve the surface morphology. In addition, as shown in FIG. 10B, right, there are fadeless brown spots on the T-Perovskite surface, which indicates that the high-energy plasma during the sputtering process could damage the T-Perovskite.

As such, the inventors devised to use solution-processed perhydropolysilazane (PHPS) to prepare the silicon oxide layer for the MTPW.

Figure 11:
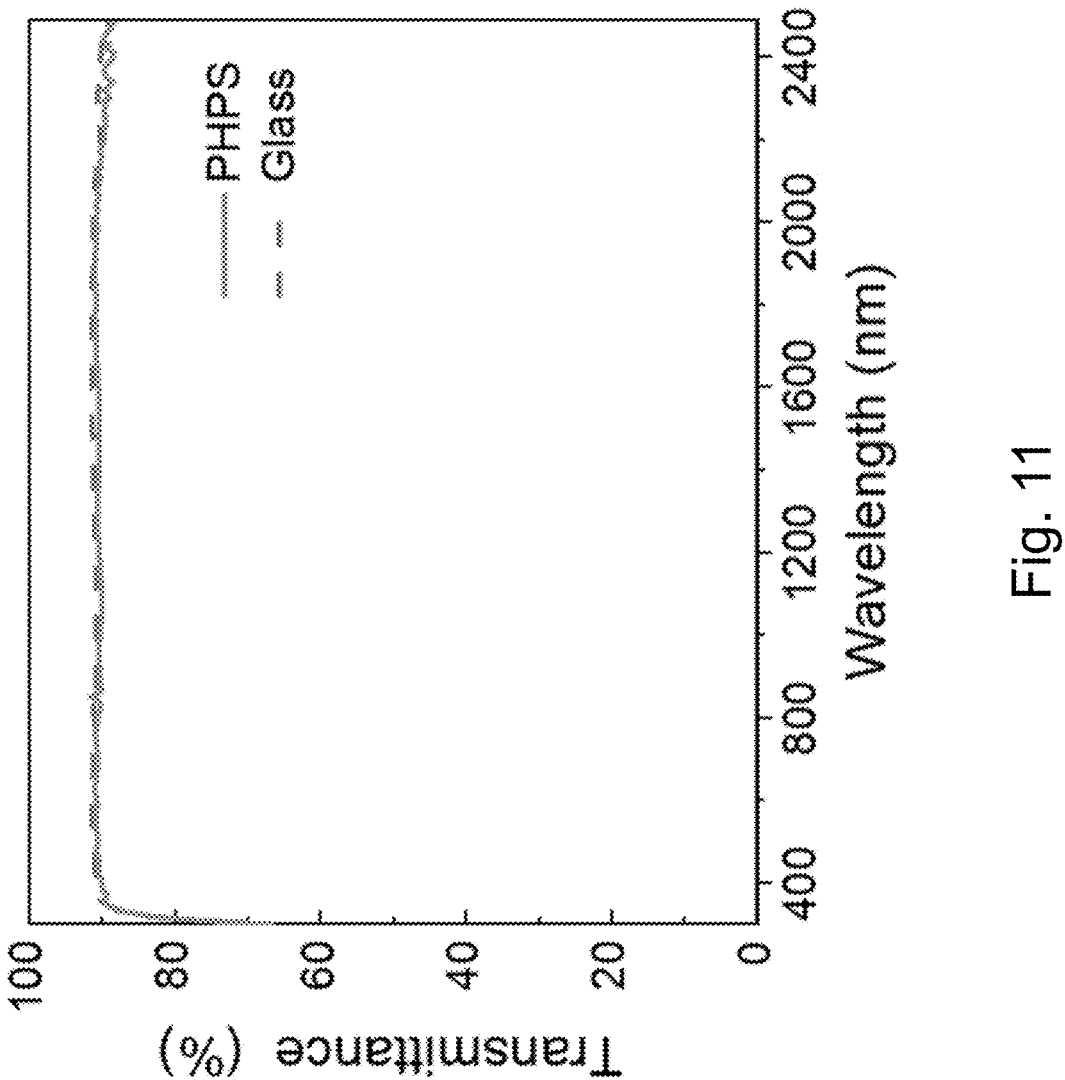
FIG. 11 shows the transmittance spectra of the glass and PHPS-coated glass showing the high transparency of the PHPS coating. The thickness of the PHPS coating was ~1.8 μm.
Figure 12:
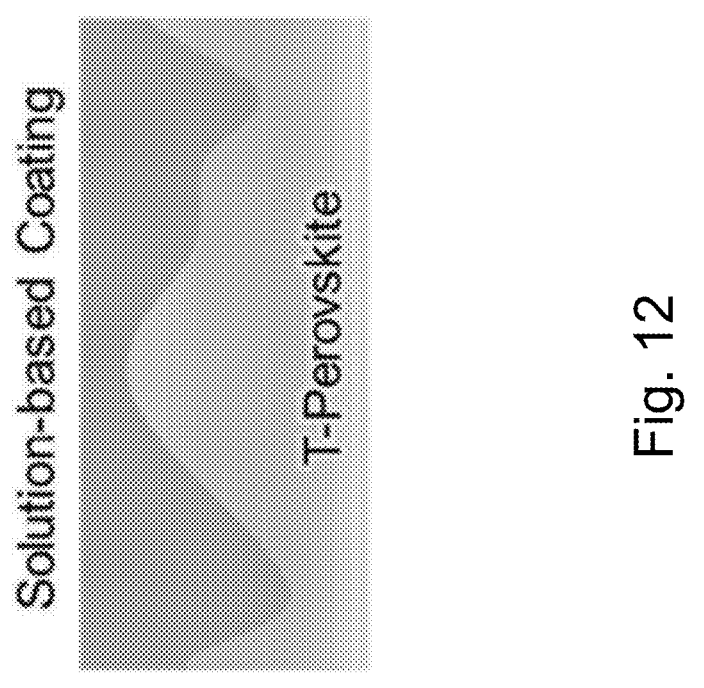

PHPS is a kind of silicone that consists of silicon and nitrogen atoms in its backbone ($SiH_2$—NH). Upon annealing in air, PHPS solidifies to yield a homogeneous inorganic $SiO_x/SiON_x$ film, demonstrating better barrier properties and lower sensitivity than polymers in harsh environments. The transmittance of the PHPS-coated glass was found to be ~90%, which is almost as high as that of the bare glass due to its n=1.55 being comparable to that of glass (FIG. 8 and FIG. 11). PHPS solution can be easily deposited using solution-based methods, such as spin-coating and spray-coating, thus smoothing the roughness of the T-Perovskite surface (FIG. 12).

It is noted that perovskite-based devices generally relied heavily on the antisolvent crystallization method to achieve high-quality films. However, it is believed that this method has yet to be successfully applied to T-Perovskites. Additionally, common antisolvents are toxic, and dripping antisolvents requires much operating experience. Compared with the antisolvent method, without any toxic chemical treatment or cumbersome operating technique, a smooth T-Perovskite window can be easily achieved by depositing a layer of PHPS in this study, which is more environmentally friendly and convenient. These advantages of PHPS not only protect the T-Perovskite from excess water vapor but also improve its optical transmittance.

Figure 13:
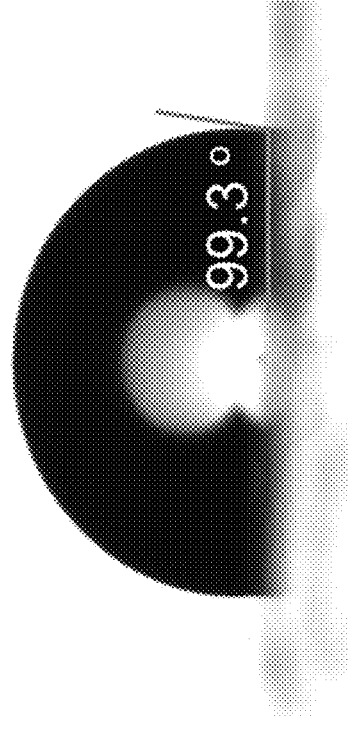
FIG. 13 shows the contact angle of PHPS coated on glass.

Meanwhile, given that the T-Perovskite window may be exposed to bulk water or with water droplets accumulated on its surface in practical application, it is appreciated that the PHPS (with a water contact angle of only ~99° (FIG. 13), which suggests that it is not superhydrophobic) alone may not be able protect the T-Perovskite window from damage under continuous water penetration. Thus, the inventors devised that, similar to the hydrophobic spunbonded fabric in a mask that blocks body fluids, a superhydrophobic fluorinated nanosilica layer is applied on top of the MTPW to endow it with excellent water repellency.

Example 3

Optical Properties of MTPW

Figure 14:
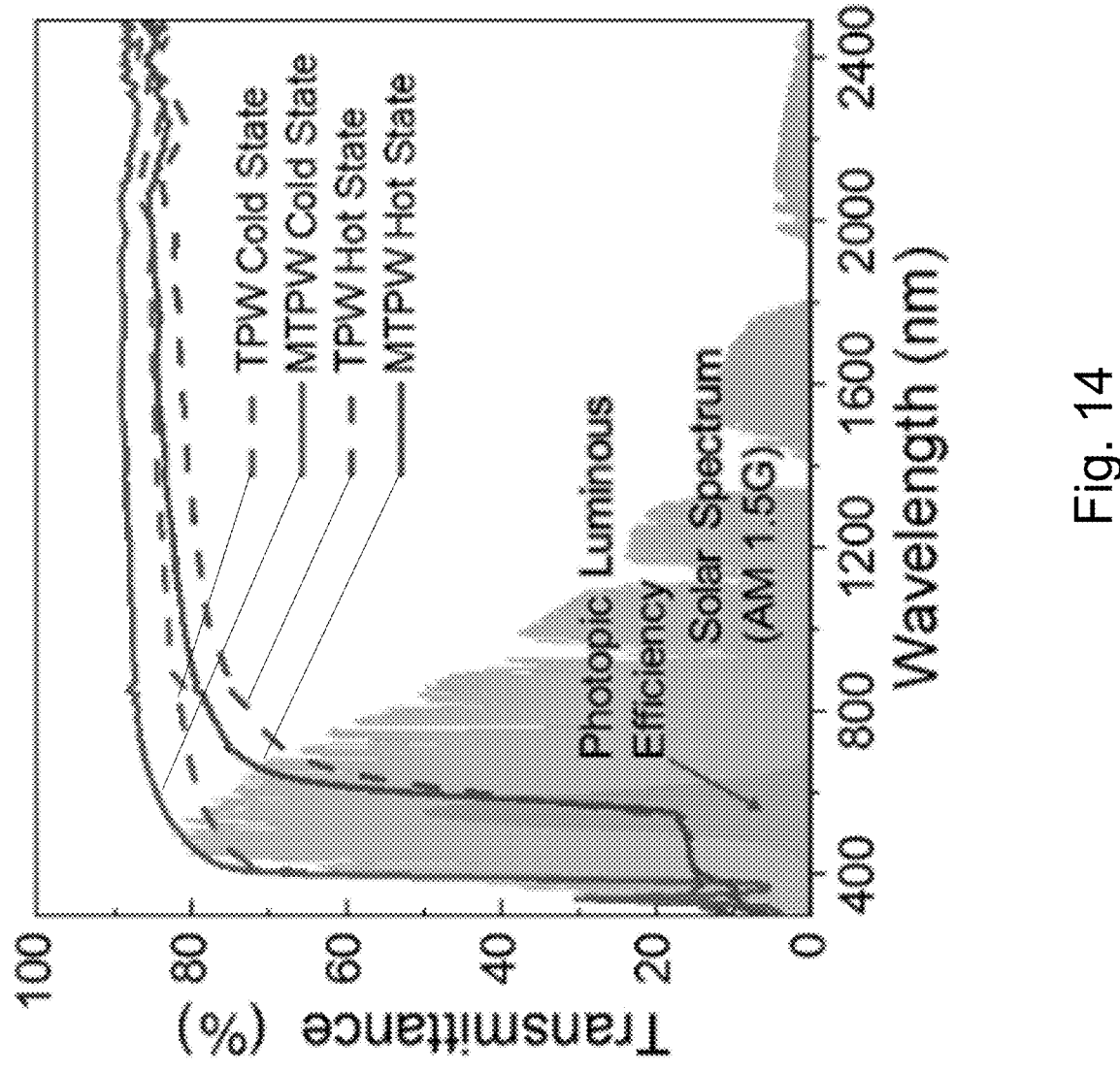
FIG. 14 shows the transmittance spectra of the TPW and MTPW, together with the AM1.5 G solar spectrum.

The transmittance spectra of the MTPW and TPW are shown in FIG. 14. The MTPW exhibited a $\tau_{lum}$ of 83.4% at the cold state and 30.4% at the hot state, with a $\Delta\tau_{sol}$ of 24.4%, while the $\tau_{lum}$ of the TPW were 78.2% and 28.8% at the cold and hot states, respectively, with a $\Delta\tau_{sol}$ of 25.4%. Notably, both the $\tau_{lum,cold}$ and $\tau_{lum,hot}$ of the MTPW were higher than those of the TPW because less light scattering occurred at the surface, and therefore, the amount of haze decreased.

Figure 15:
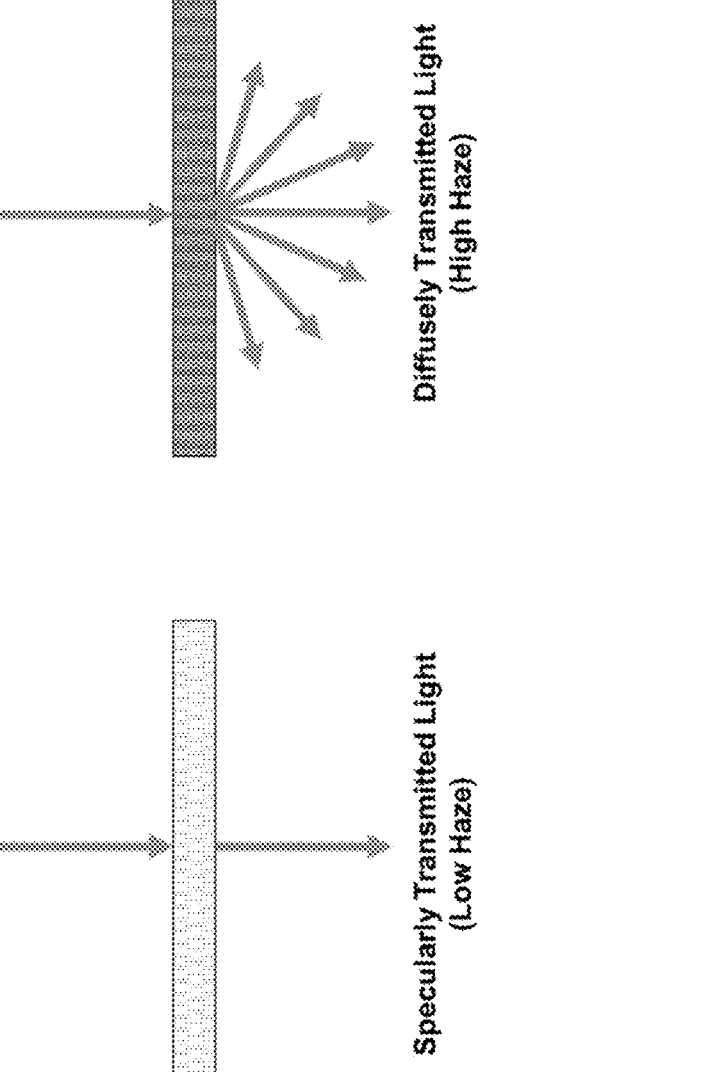
FIG. 15 is a schematic diagram illustrating the specularly transmitted light and diffusely transmitted light.
Figure 17:
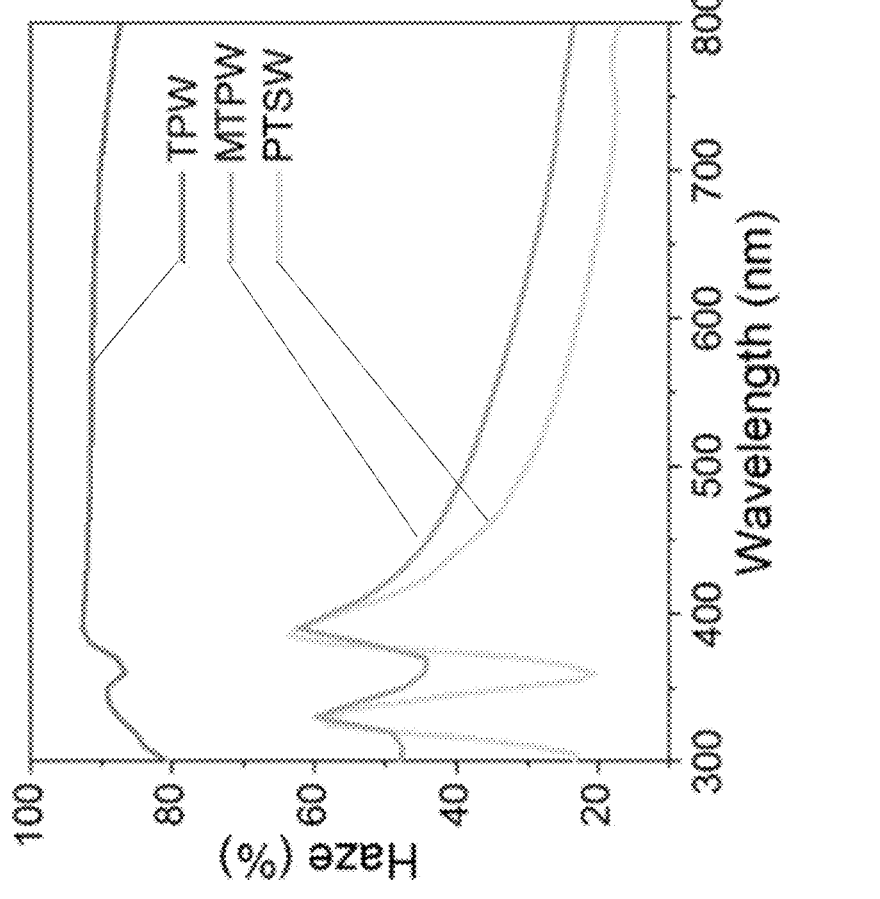
FIG. 17 shows the optical haze of the TPW, PTPW and MTPW in the wavelength range of 300-800 nm.

Optical haze, which can be defined as the ratio of diffuse transmittance to total transmittance including both the specular and diffuse parts, is an important parameter for windows (FIG. 15). A low-haze window would provide a clear view, while a high-haze window would obscure the view via light distortion, although the total transmittance remains high. Even though the pristine TPW has advantages in both $\tau_{lum}$ and $\Delta\tau_{sol}$ compared to other solution-based smart windows (e.g., for VO$_2$ thermochromic windows, $\tau_{lum}$ and $\tau_{sol}$ are typically ~50% and ~10%, respectively), the high haze of TPW windows is neglected in most studies. As shown in FIG. 16, the pavilion 10 m from the TPW cannot be seen, whereas it can be clearly observed through the MTPW. Optical measurements also verified that the optical haze of the TPW was as high as 90%, whereas that of the PTPW and the MTPW was markedly reduced to as low as 20% and 30%, respectively (FIG. 17).

Figure 18:
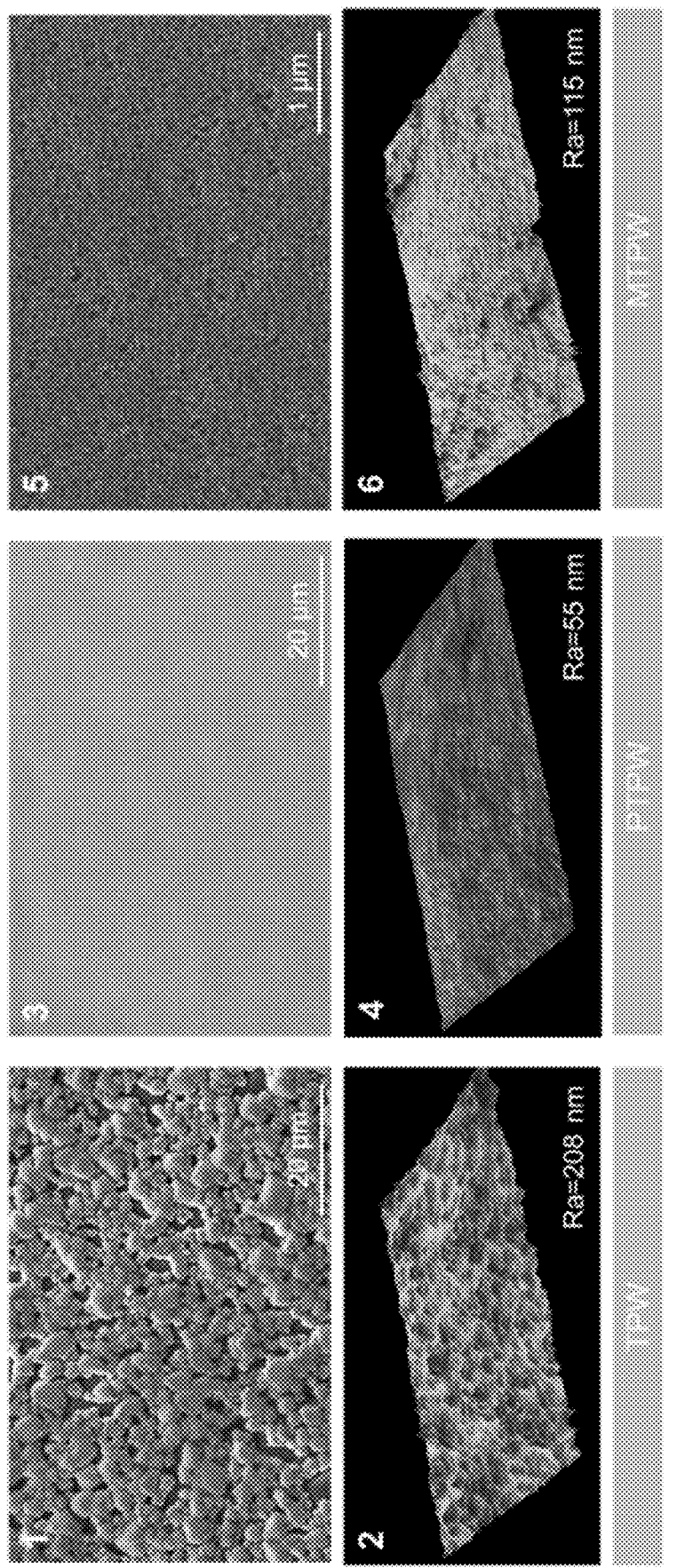
FIG. 18 shows the SEM images, 3D optical surface profiles and roughness of the pristine TPW, PTPW and MTPW.
Figure 19:
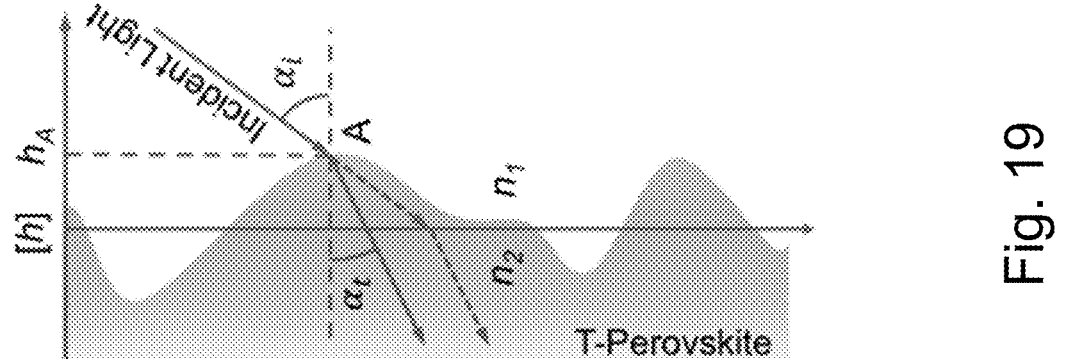
FIG. 19 is a schematic diagram illustrating the light propagation through a rough surface.

To explain this phenomenon, the surface morphologies of TPW, PTPW and MTPW were characterized (FIG. 18). The TPW possessed a rough and uneven surface (FIG. 18, image 1), which was attributed to the excess MAI in the perovskite precursor that influenced the crystallization process. The 3D morphology quantitatively determined by a surface profiler indicated that the roughness of the TPW surface was R$\alpha$=208 nm (FIG. 18, image 2). However, after coating with PHPS, the surface of the PTPW was quite flat, as shown in FIG. 18, image 3, and Ra was significantly reduced to 55 nm (FIG. 18, image 4). Based on this observation, the enhanced optical performance of MTPW may be explained quantitatively as follows: FIG. 19 shows the light path at a T-Perovskite surface. Along the plane wave propagation path, different parts of the wavefront encounter a rough surface at different heights. Therefore, the scattered components have a phase difference. With respect to the components transmitted from point A of the rough surface and the flat surface at the mean height [h], the phase difference is:

$$\Delta\varphi = k\Delta h(n_1 \cos\alpha_i - n_2 \cos\alpha_t), \qquad (a)$$

$$k = \frac{2\pi}{\lambda}, \qquad (b)$$

$$\Delta h = h_A - [h], \qquad (c)$$

where k is the wavenumber in vacuum, $\Delta h$ is the height variation around the mean value of the rough surface height [h], and n is the refractive index of the media. According to the Rayleigh roughness criteria, the standard deviation of the phase difference should be less than $\pi/2$ to ensure constructive interference (i.e., spectacular transmission). In this case, the surface can be considered slightly rough or even flat. To meet the Rayleigh roughness criteria, based on equations (a)-(c), the following must hold:

$$\sqrt{\frac{\sum_{A=1}^{N}(h_A - [h])}{N}} = RMS < \frac{\lambda}{4(n_1 \cos\alpha_i - n_2 \cos\alpha_t)}. \qquad (d)$$

Equation (d) indicates that when the two media have closer refractive indices, the tolerance to the RMS is larger, and vice versa. Both the rough surface of the TPW and the large refractive index difference between air (n≈1.0) and the T-Perovskite (n≈2.0) cause strong scattering when light encounters peaks and valleys, causing a high optical haze and a reduced specular transmittance. PHPS has an n value relatively close to that of the perovskite compared to air. Therefore, the adoption of PHPS on top can improve the light propagation path tolerance to the surface roughness (equation (d)), reducing the light scattering at the T-Perovskite surface boundary. Moreover, the n value of PHPS is between those of air and the T-Perovskite, and it can also serve as an antireflection layer to improve the total transmittance.

Figure 20:
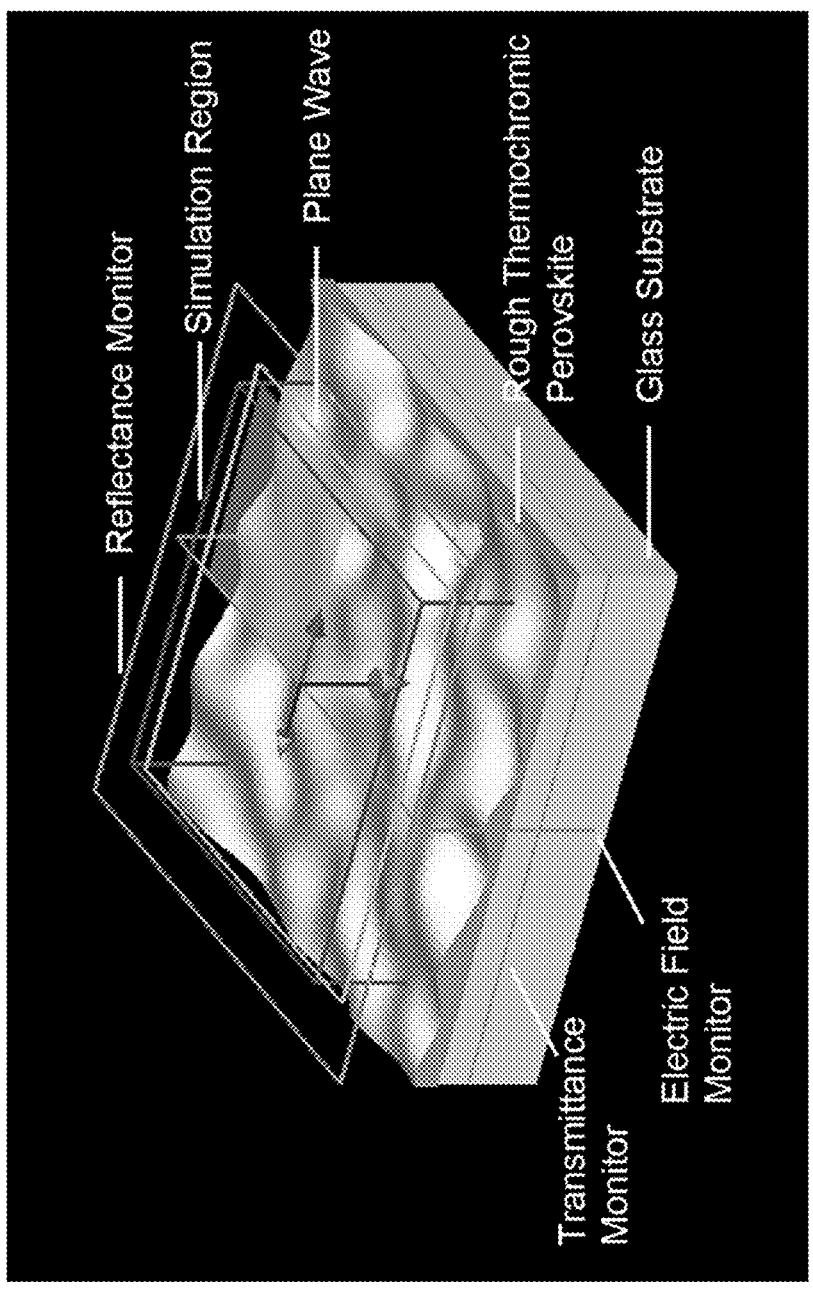
FIG. 20 is a schematic diagram illustrating the FDTD model for simulating light transmission, reflection and propagation directions.
Figure 21:
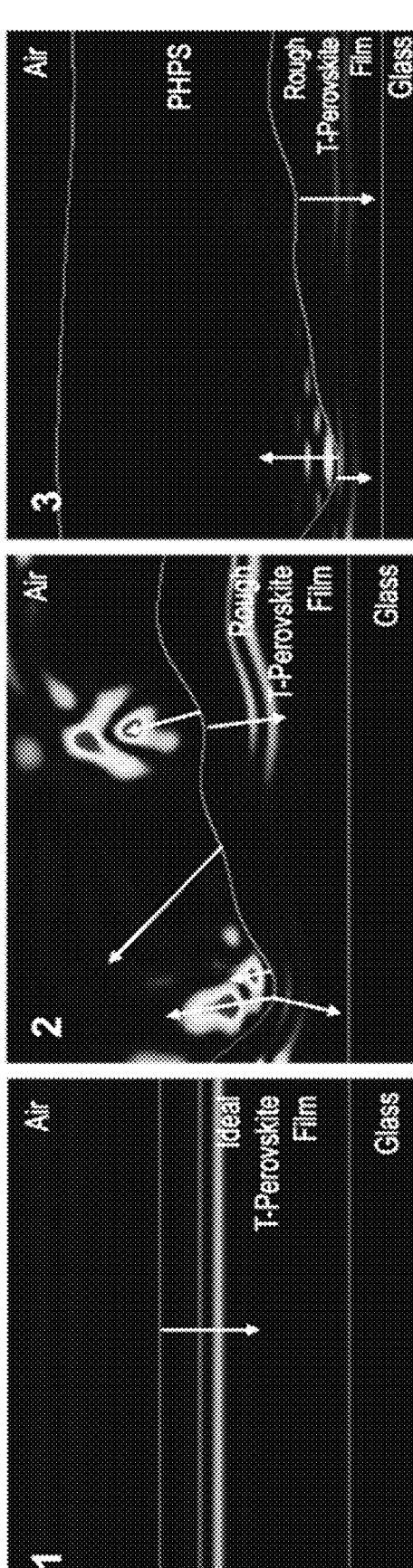
FIG. 21 shows the light propagation process at the air/window interface of an ideally smooth TPW, a rough TPW and a PTPW.

To verify the above explanation, a finite-difference time-domain (FDTD) simulation was conducted to analyze light propagation through different surfaces. The model established via FDTD software is shown in FIG. 20. The complex refractive indices of PHPS and the T-Perovskite (H-MAPbI$_{3-x}$Cl$_x$) at both the cold and hot states were measured by means of an ellipsometer, as shown in FIG. 8. FIG. 21 demonstrates the light propagation process at the air/window interface of an ideally smooth TPW, a rough TPW and a PTPW.

Figure 22:
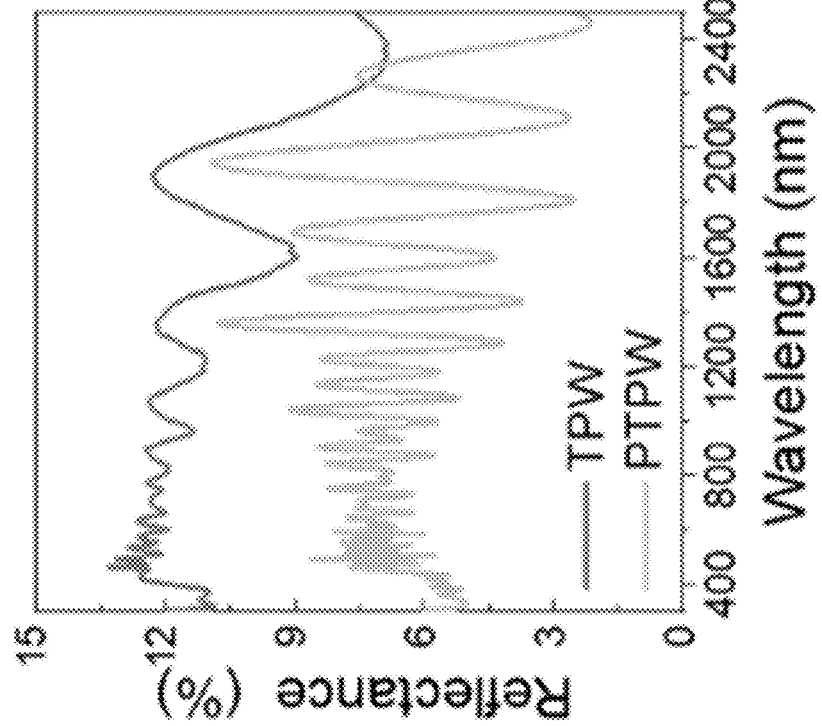
FIG. 22 shows the stimulated reflectance of the TPW and PTPW.

For the ideal TPW, the direction of light propagating along the normal direction will not change at the air/window interface (FIG. 21, image 1), leading to a high specular transmittance and low haze. However, if the TPW surface is rough (the roughness data of the TPW are taken from FIG. 18, image 2), then the propagation path of light will obviously change at the air/TPW interface due to strong scattering (FIG. 21, image 2), leading to increased diffuse reflection and transmission. After depositing PHPS (the roughness data of PHPS are taken from FIG. 18, image 4) on the rough TPW surface, most of the light maintained its original path along the normal direction, and the scattering at the T-Perovskite surface was significantly suppressed compared with that for the rough TPW (FIG. 21, image 3). When comparing FIG. 21, image 2 with FIG. 21, image 3, it is noted that the reflected field intensity above the air/window surface was reduced after coating PHPS. The simulated reflectance spectra further prove that the reflectance on the TPW was reduced from 11.8% to 6.8% (FIG. 22). This desired reflectance reduction was caused by the antireflection effect of the PHPS layer resulting in an increase in $\tau_{lum}$ (FIG. 2).

Figure 23:
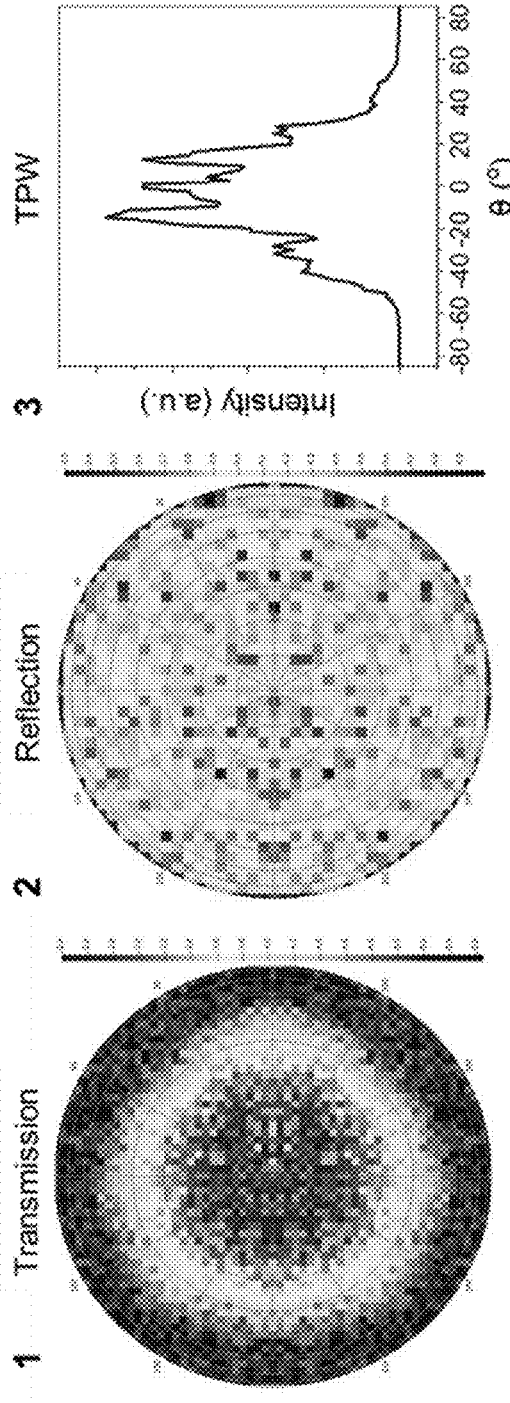
FIG. 23 shows the angular distribution of scattered light in the transmitted and reflected fields of the TPW.
Figure 24:
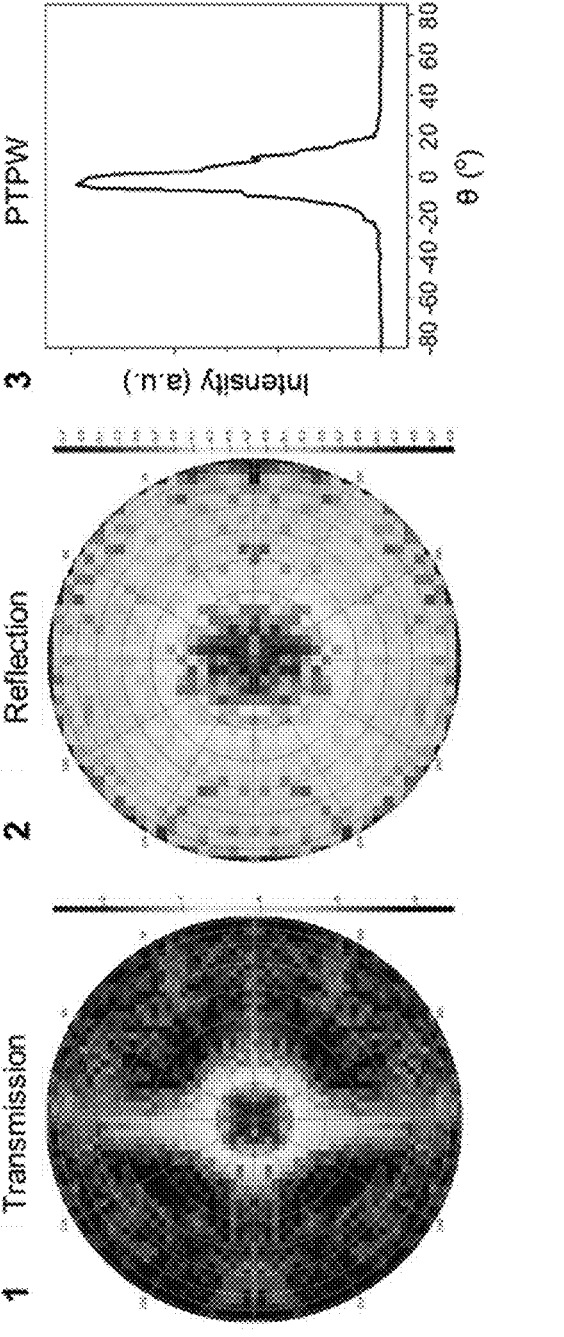
FIG. 24 shows the angular distribution of scattered light in the transmitted and reflected fields of the PTPW.

In addition, the angular distributions of scattered light in the reflected and transmitted fields for the rough TPW and smooth PTPW were also extracted from the FDTD simulation based on the bidirectional scattering distribution function (BSDF). The BSDF can radiometrically characterize the light scattering at a surface as a function of the angular positions of the incident and scattered beams. The scattered light in both the transmitted and reflected fields for the rough TPW surface was distributed over a wider angle range (FIG. 23), leading to a blurry visual effect. In contrast, for the PTPW surface, both the transmitted and reflected light was concentrated in a smaller angle range (FIG. 24), resulting in a clearer view. In sum, it is believed that the top PHPS layer benefited the optical performance of the TPW in two ways: through a large reduction in the haze by smoothing the originally rough surface and through an increase in the total transparency via the antireflection effect.

Figure 25:
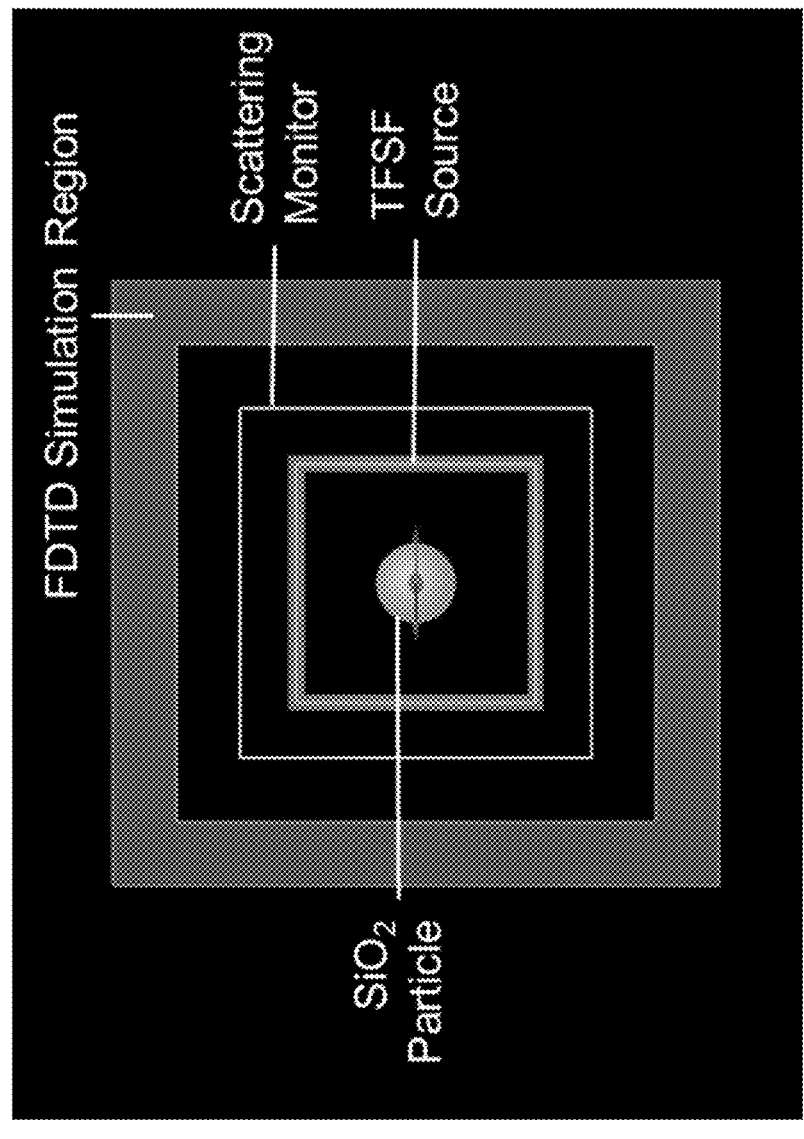
FIG. 25 shows the FDTD simulation model for calculating the scattering efficiency of a $SiO_2$ nanoparticle.
Figure 26:
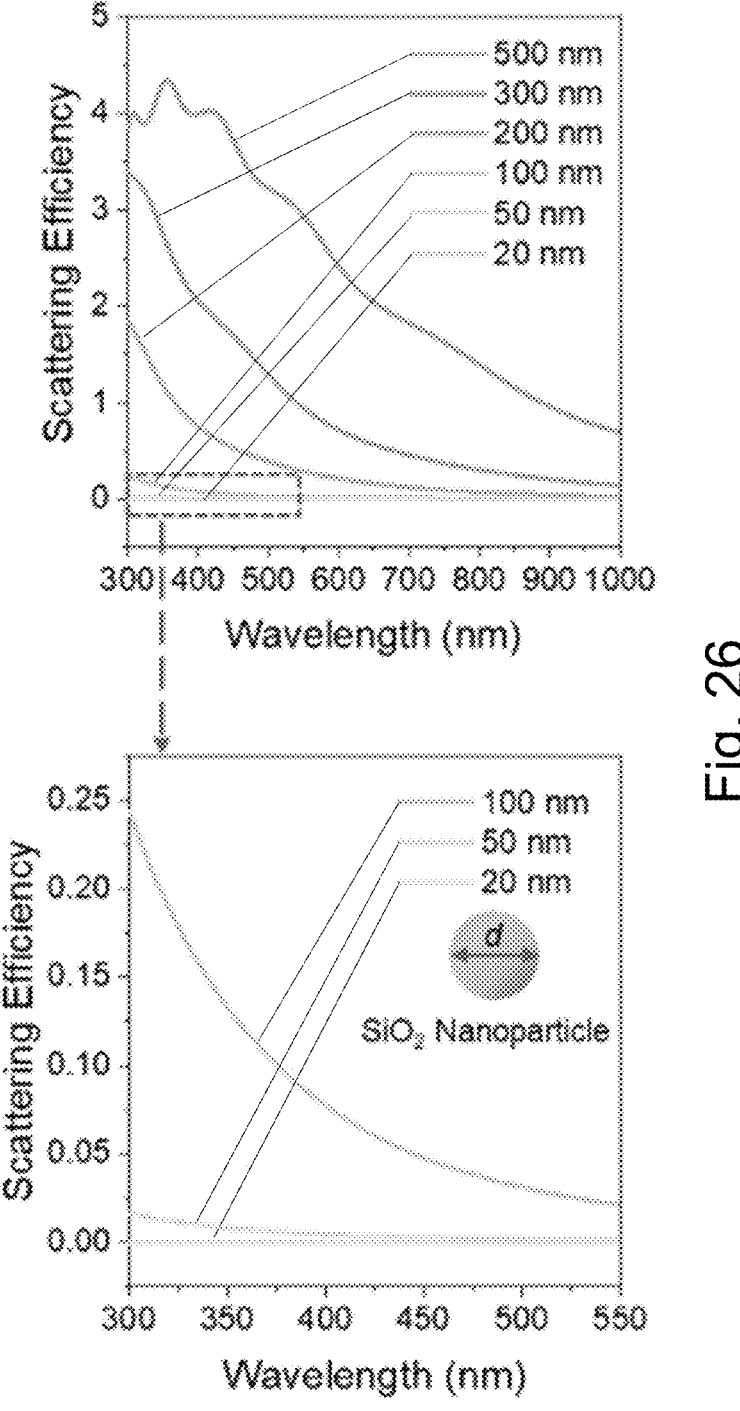
FIG. 26 shows the scattering efficiency of $SiO_2$ nanoparticles of different sizes.
Figure 27:
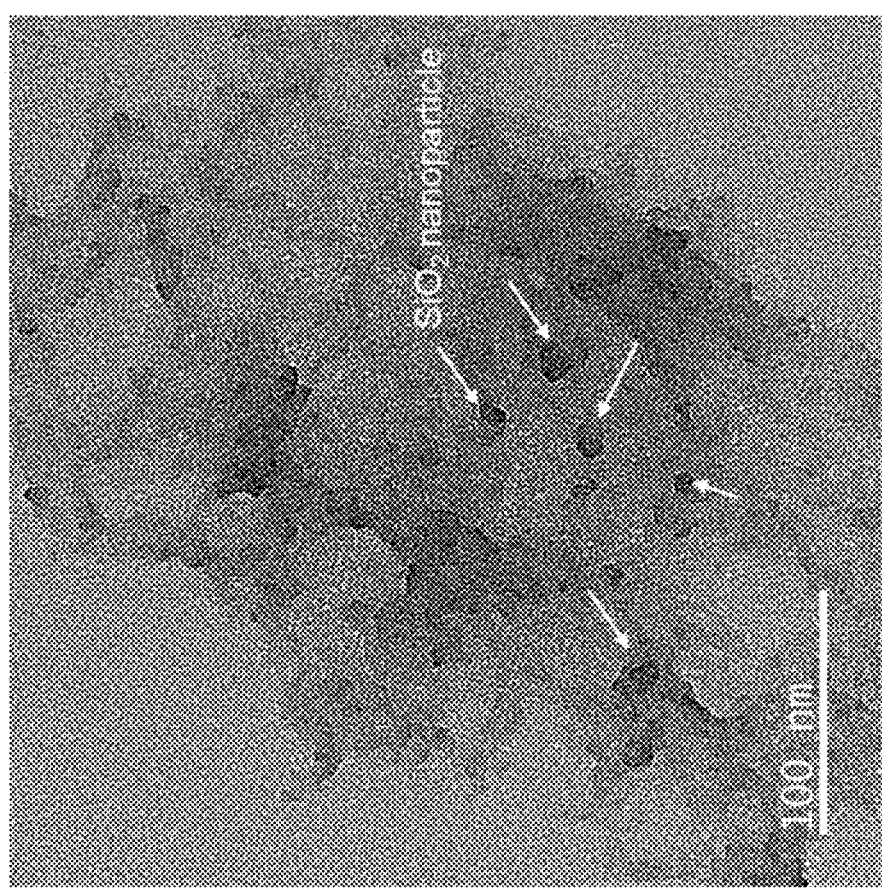
FIG. 27 is a TEM image of $SiO_2$ nanoparticles of the top layer of the MTPW.
Figure 28:
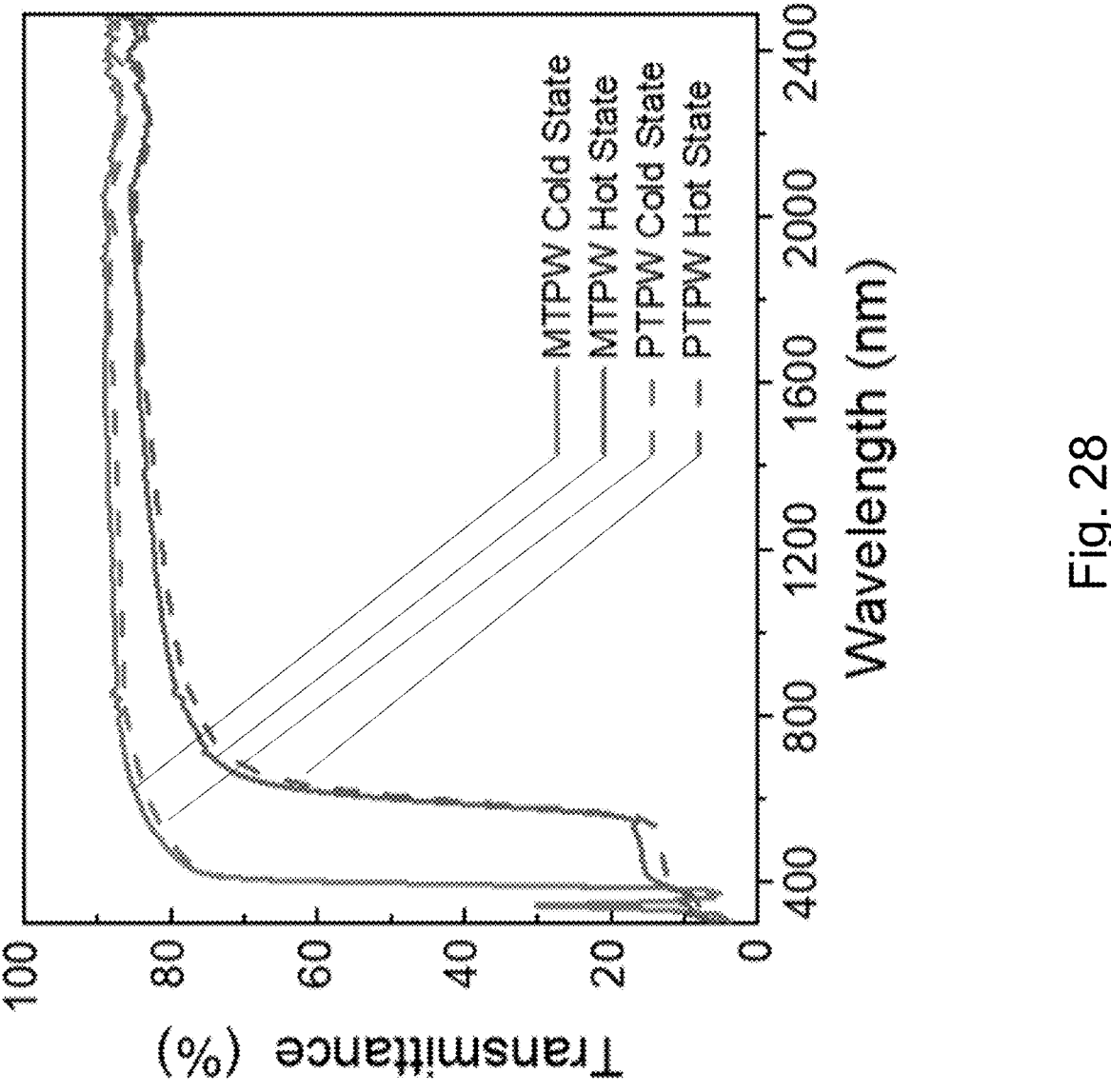
FIG. 28 shows the comparison of the transmittance spectra of the PTPW and MTPW to verify that the $SiO_2$ nanoparticles do not impair the transparency.

The top layer of the MTPW is a superhydrophobic layer of nanoparticles for achieving water repellency. It is believed that SiO$_2$ has the lowest refractive index in the visible light range of 1.45 among the nanoparticles in the art, and therefore it is selected to minimize light scattering. Moreover, according to Mie scattering theory, the particle size also influences the scattering efficiency ($Q_s$). The $Q_s$ of a SiO$_2$ nanosphere is calculated as a function of the particle diameter across the solar spectrum using FDTD simulations (FIG. 25). FIG. 26 shows that $Q_s$ decreased as the diameter decreased. $Q_s$ was very small when the diameter was 20 nm, indicating a limited influence on the optical performance. Thus, SiO$_2$ nanoparticles with 20 nm in diameter were chosen for the fabrication of the MTPW (FIG. S27). As confirmed in FIG. 28, the transmittance spectrum of the MTPW was almost the same as that of the PTPW without SiO$_2$ nanoparticles. The haze only slightly increased due to the increase in roughness (FIG. 17, FIG. 18, images 5 and 6).

Example 4

Transition Properties of MPTW

For a thermochromic smart window, it is appreciated that in addition to its excellent optical performance, transition properties including a low transition temperature (T$_c$) and a short transition time (t) are also desired. As such, the transition properties of the MTPW are investigated. In particular, the effect of the PHPS layer and SiO$_2$ nanoparticles to the relatively low T$_e$ of the H-MAPbI$_{3-x}$Cl$_x$ perovskite in the heating (T$_{c,h}$) and cooling (T$_{c,c}$) processes are investigated.

Figure 29:
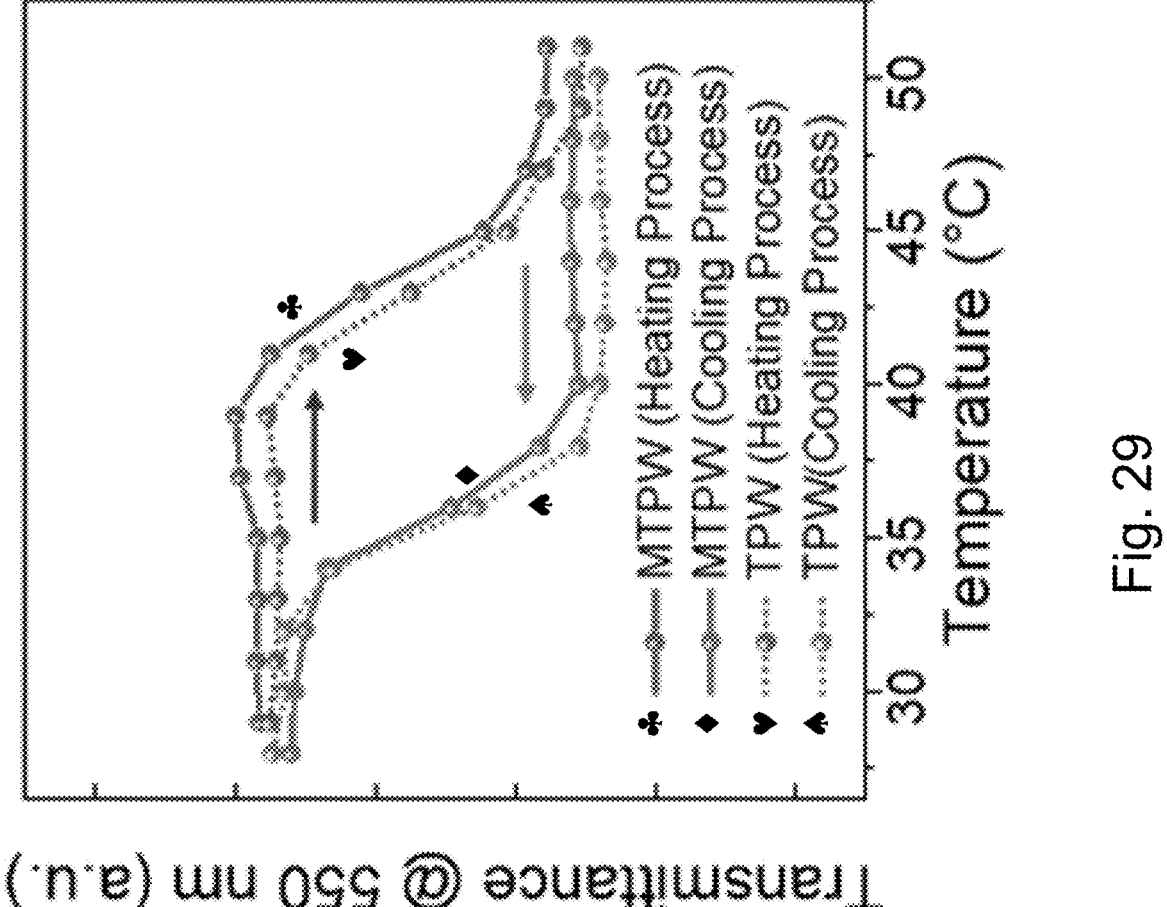
FIG. 29 shows the transmittance of the MTPW and the TPW at 550 nm as a function of temperature showing the transition process upon temperature changes.
Figure 30:
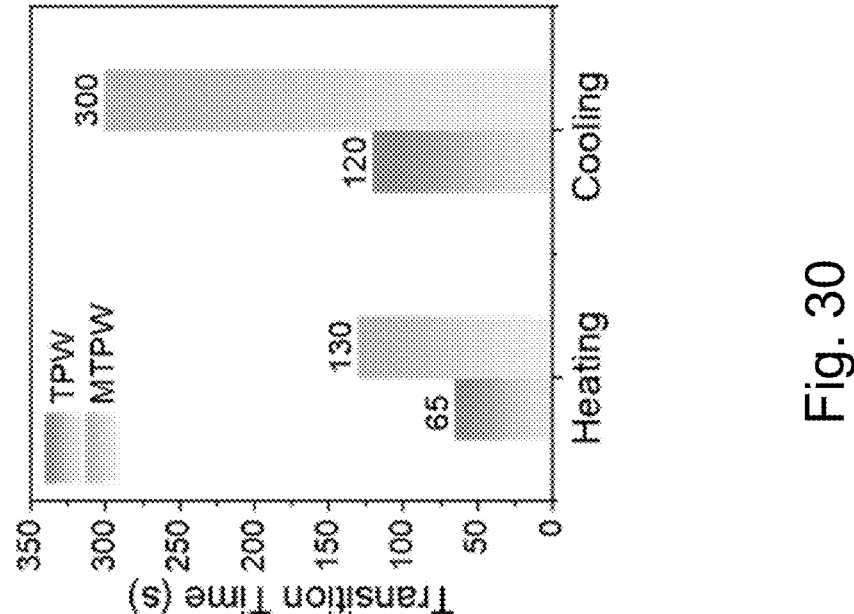
FIG. 30 shows the transition times of the MTPW and pristine TPW.

As shown in FIG. 29, the temperature-dependent transition processes of the TPW and the MTPW were almost the same. The calculated T$_{c,h}$ and T$_{c,c}$ values of the pristine TPW were 43.2° C. and 35.6° C., respectively, while those of the MTPW were 43.4° C. and 35.9° C., respectively, implying that the coatings had no influence on T$_c$. In addition, as shown in FIG. 30, the pristine TPW completed its color switching in 65 s and 120 s during the heating and cooling processes, respectively. For the MTPW, because the PHPS and SiO$_2$ nanoparticle layers limited the water vapor transport rate, the transition times in the heating and cooling process were inevitably extended to 120 s and 300 s, respectively, which are still considered as acceptable for practical applications.

Example 5

Superhydrophobicity, Long-Term Stability of MTPW

Figure 31B:
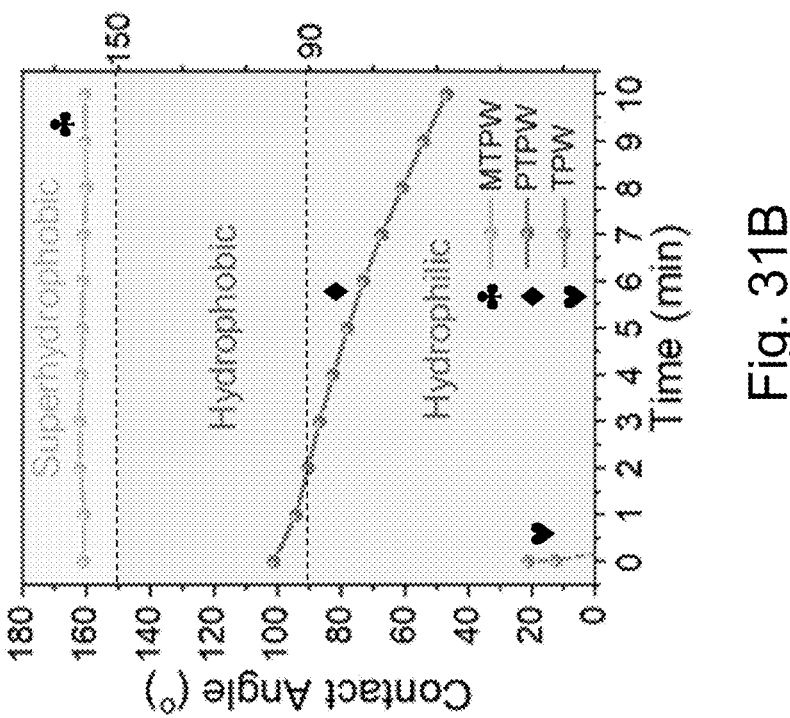
FIG. 31B is a plot of contact angles against time showing the superhydrophobic, hydrophobic and hydrophilic areas, and the time-dependent contact angle measurement results of TPW, PTPW, and MTPW corresponding to FIG. 31A.
Figure 31A:
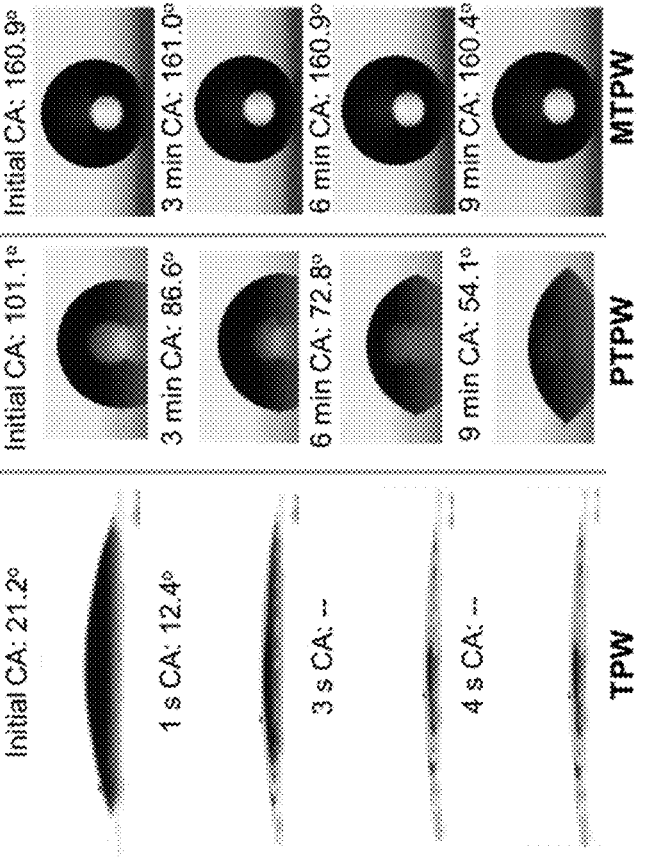
FIG. 31A shows the images of time-dependent contact angle measurement of the TPW, PTPW, and MTPW.
Figure 32:
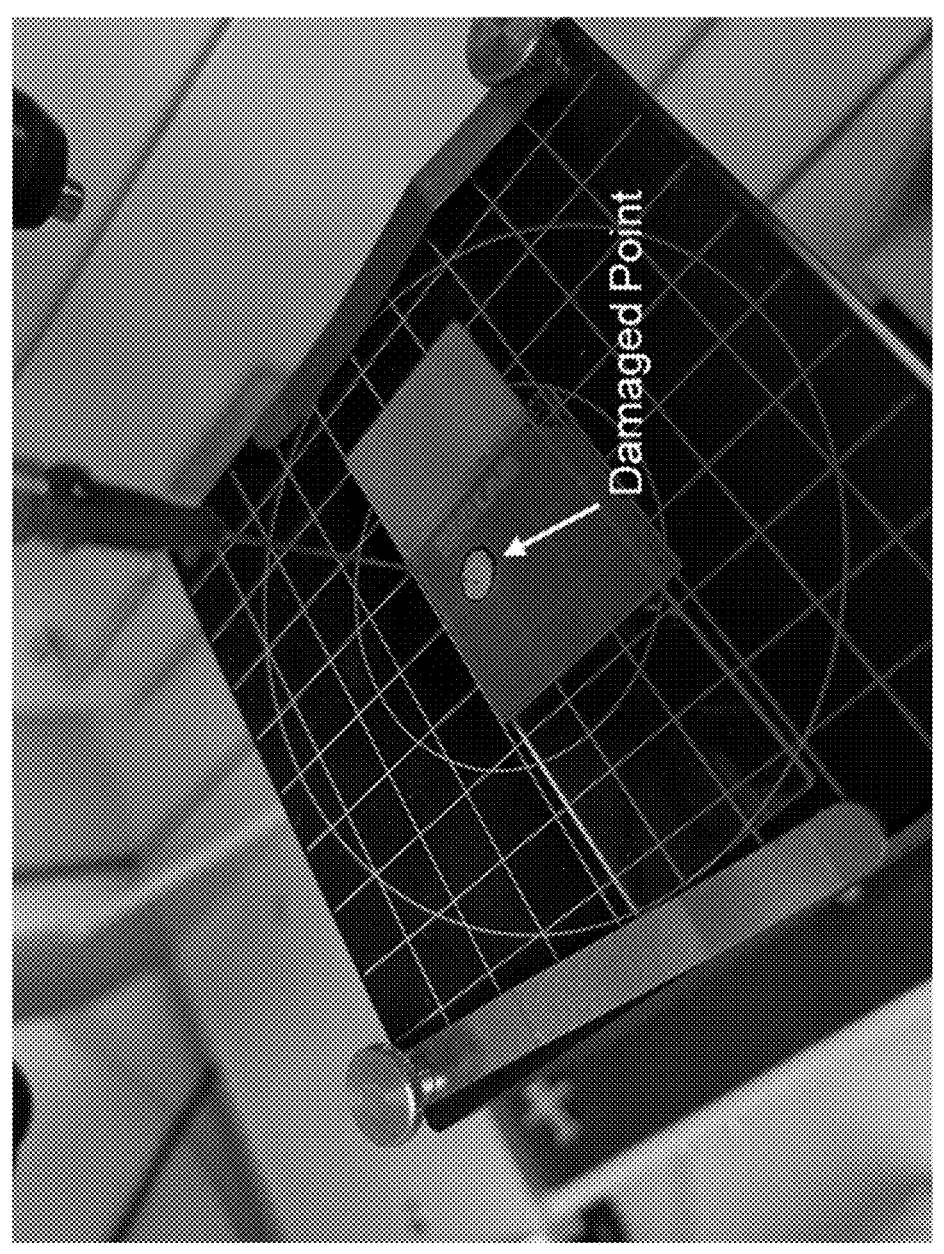
FIG. 32 is an image showing the surface of pristine TPW was rapidly damaged by a water droplet dripped thereon.

The wettability of the pristine TPW and PTPW are compared and the results are shown in FIGS. 31A and 31B. As shown, the pristine TPW was hydrophilic, with an initial contact angle (CA) of 21.2°, and the T-Perovskite film was immediately damaged by the water droplet (FIG. 32). The CA decayed to 12.4° in 1 s and could not be measured by the CA meter after 3 s, indicating severe corrosion by water. The PTPW exhibited a higher CA of 98.4°, but the CA rapidly decreased to 54.1° after 9 min. The poor hydrophobicity of the TPW and PTPW could not effectively repel water on the window surface. Therefore, a superhydrophobic feature of the T-Perovskite smart window should be achieved to physically impede harmful moisture and water.

Figure 33:
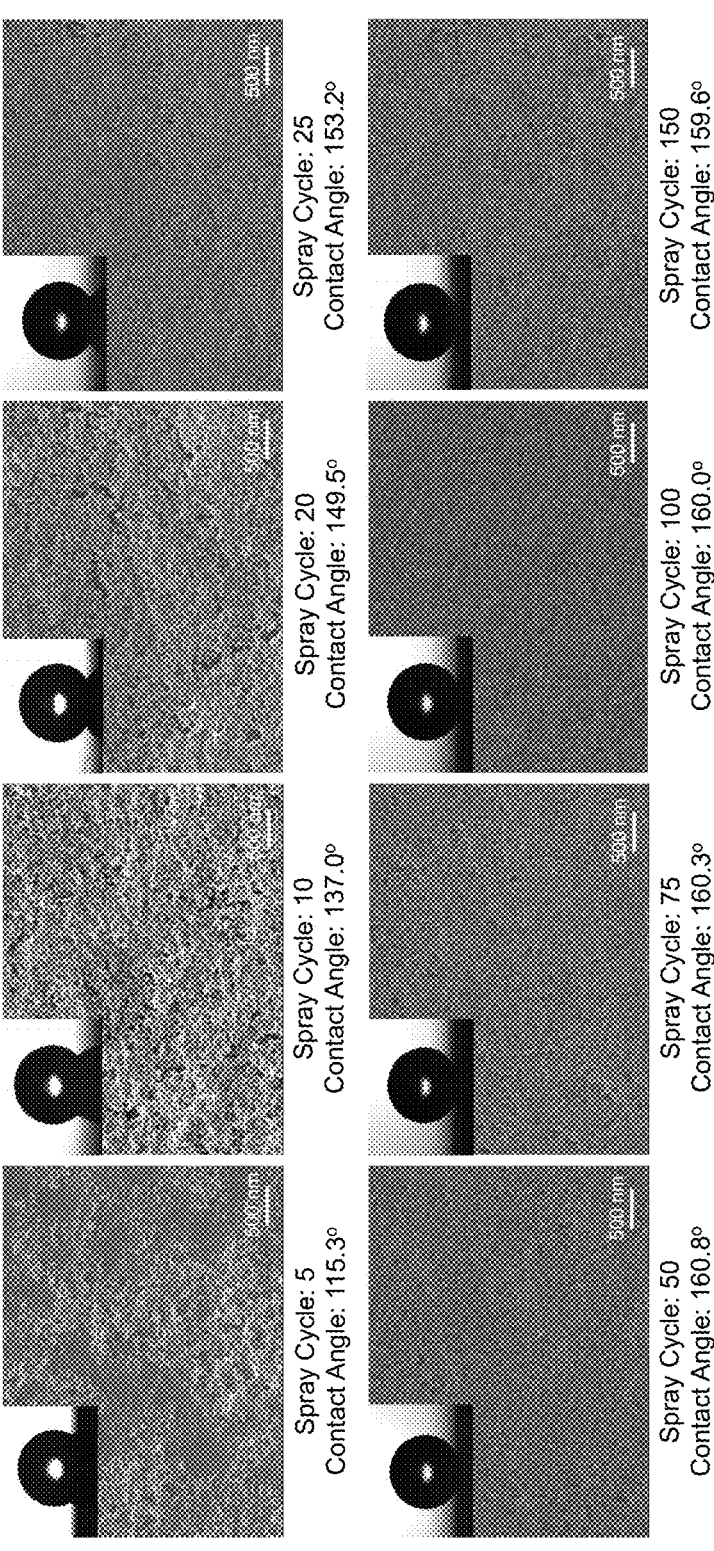
FIG. 33 shows the SEM top-view images of the surface morphology obtained by spraying $SiO_2$ nanoparticles for different numbers of cycles and their corresponding contact angles.
Figure 34:
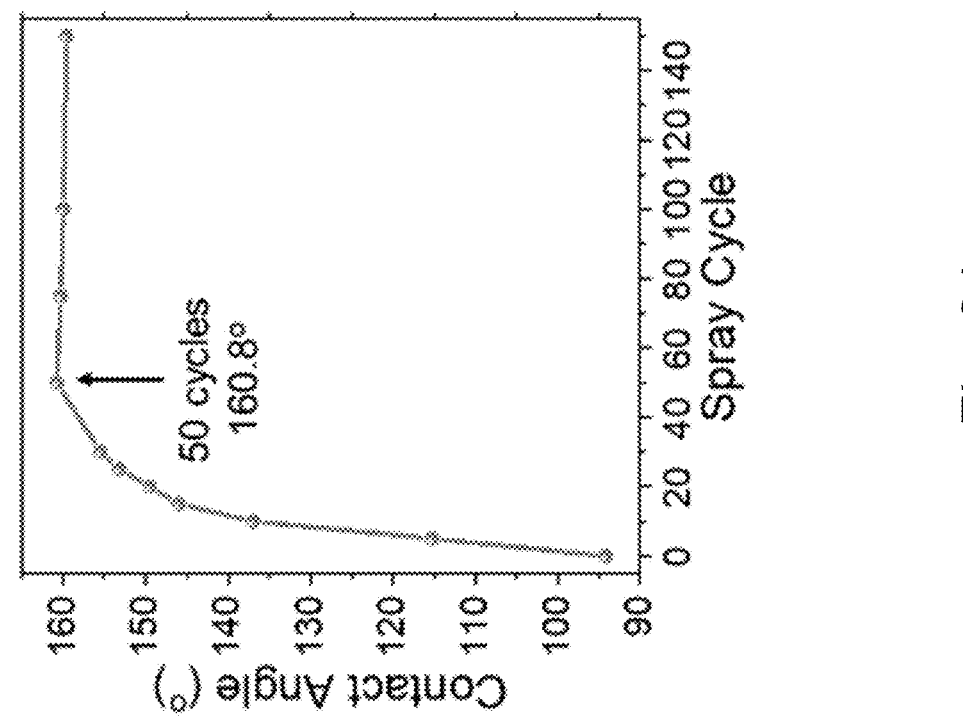
FIG. 34 shows the water contact angle of the MTPW vs. spray-coating cycle for the $SiO_2$ nanoparticles during the fabrication process.
Figure 35:
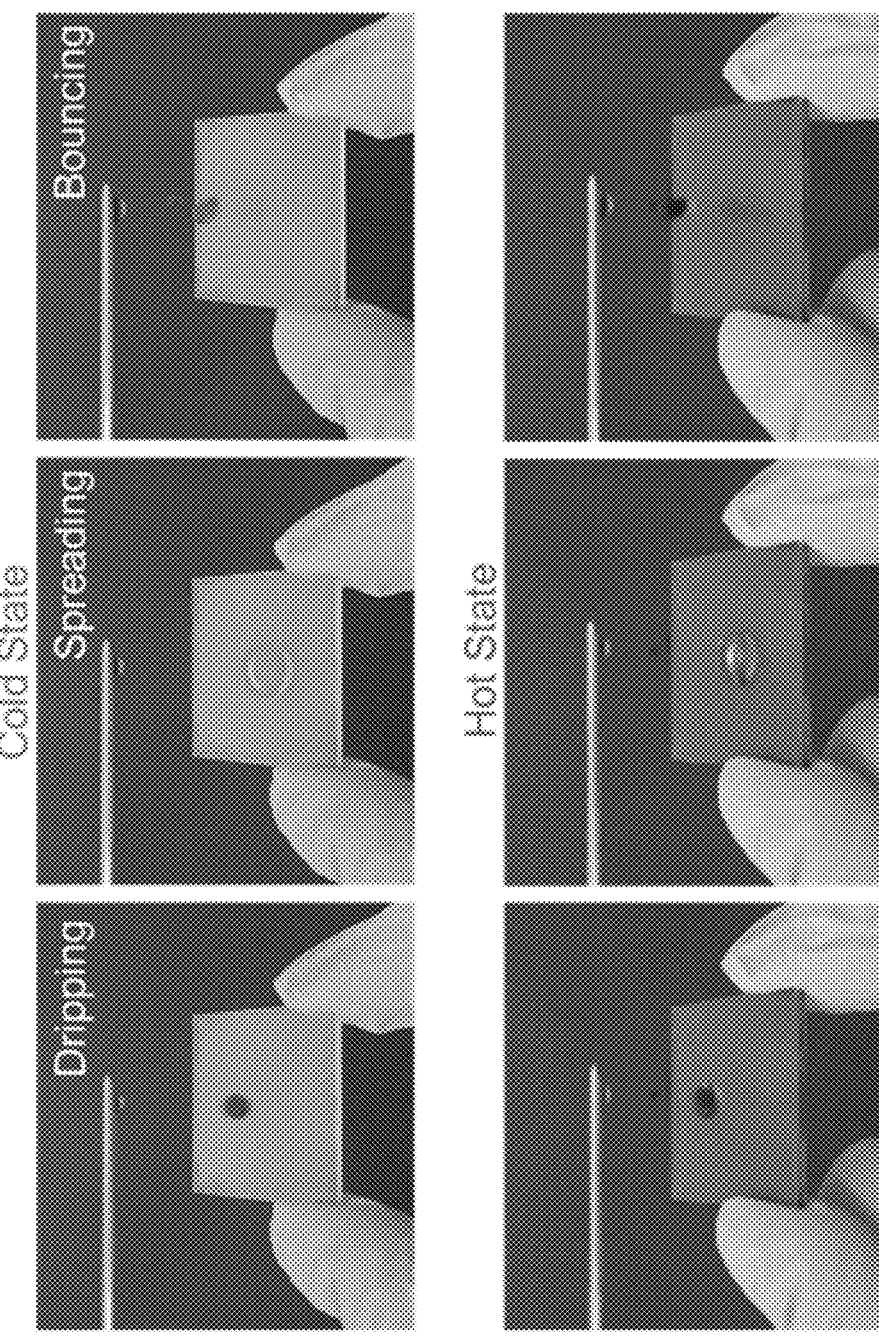
FIG. 35 shows the superhydrophobicity of the MTPW. A dripped water droplet bounces off from the MTPW at both the cold and hot states.

As described above, superhydrophobic SiO$_2$ nanoparticles with 20 nm in diameter were coated on the PHPS layer. FIG. 33 shows surface SEM images of SiO$_2$ nanoparticles for different numbers of spin-coating cycles. As the number of spray-coating cycles increased, the packing density of SiO$_2$ nanoparticles increased, and the surface was almost fully covered by SiO$_2$ nanoparticles when the number of cycles was above 25. FIG. 34 demonstrates the influence of the spray-coating cycle number on the CA, in which a rising trend from 115.3° with 5 cycles to 160.8° with 50 cycles was observed. After 50 cycles, the CA was almost unchanged and even slightly decreased. This may be attributed to the fully covered SiO$_2$ nanoparticles that lead to an increase in the area of the liquid-solid contact interface, resulting in a higher surface adhesion force. In addition, the sliding angle of the MTPW was only 5.7° for 50 cycles, which is beneficial for the window. Therefore, it is suggested that the optimal SiO$_2$ spray-coating protocol is 50 cycles. After deposition of the SiO$_2$ nanoparticles, the MTPW demonstrated superhydrophobicity, with a stable CA above 1600 (FIG. 31A). When a dyed droplet was dripped on the surface of the MTPW, the droplet spread into a compressed disk shape and bounced off the surface, implying prominent superhydrophobicity (FIG. 35). Such an excellent superhydrophobic property enabled the MTPW to efficiently repel water and effectively prevent T-Perovskite degradation by bulk water. Furthermore, a water jetting test was conducted to test the waterproof ability of the MTPW. The MTPW was placed under a faucet and flushed with high-speed water (flow rate: ~4.7 m/s). The T-Perovskite survived, and it still can demonstrate reversible color switch ability upon heating and cooling process, which proves the excellent water repellence of the MTPW (data not shown).

The durability of MTPW is investigated by way of evaluating the optical stability of the MTPW. Specifically, the long-term optical performance of the MTPW was examined via humidity resistance tests at different relative humidity (RH) levels. To precisely control the temperature and humidity, the experiment was conducted in an enthalpy testing chamber under 23° C. and 60% RH (normal ambient environment) and 35° C. and 80% RH (hot and humid environment) conditions.

Figure 36A:
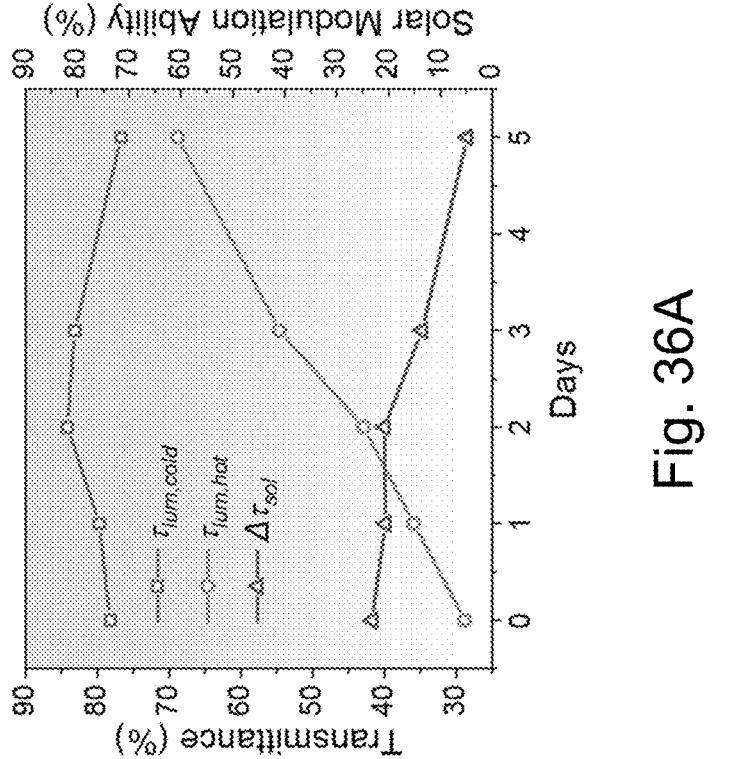

As shown in FIGS. 36A and 36B, at 23° C. and 60% RH (absolute humidity: 10.53 g/kg), all features, including the $\tau_{lum,cold}$, $t_{lum,hot}$ and $\Delta\tau_{sol}$, of the TPW displayed a distinct tendency to decay during the aging test due to moisture-induced degradation. In particular, $\tau_{lum,hot}$ significantly increased from 28.8% to 68.8% in five days, resulting in a large decrease in $\Delta\tau_{sol}$ from 23.1% to 4.8%, indicating loss of thermochromism. In sharp contrast, the MTPW maintained stable optical performance over 40 days, and $\Delta\tau_{sol}$ remained above 20% at the 45$^{th}$ day of the aging test. The significantly enhanced durability was ascribed to the strong protection of the PHPS and SiO$_2$ superhydrophobic layers, which insulated the T-Perovskite film from continuous penetration of abundant water vapor. At 35° C. and 80% RH (FIG. 37A), because of the ultrahigh water vapor concentration (absolute humidity: 28.92 g/kg), the TPW rapidly degraded after only a half day, with $\tau_{lum,hot}$ increasing to 54.6% and $\Delta\tau_{sol}$ being only 8.5%. Even though such a high humidity also influenced the MTPW, after 20 days of the aging test, the MTPW still maintained relatively stable $\tau_{lum,cold}$ and $\tau_{lum,hot}$ and an acceptable $\Delta\tau_{sol}$ of ~20% (FIG. 37B). By comparing the decay rates of $\Delta\tau_{sol}$ (FIGS. 38A and 38B), the lifespan of the MTPW was found to be considerably extended compared with that of the pristine TPW by 37 times in the normal ambient environment and by 98 times in the humid environment, making it reliable for practical applications. It is believed that the T-Perovskite windows in this work possesses the longest aging record reported thus far.

Because of the water vulnerability of T-Perovskite films, the Pb leakage issue has attracted considerable attention. In the thermochromic process, a T-Perovskite undergoes a water-induced phase transformation from MAPbX$_3$ at the hot state to MA$_4$PbX$_6$·2H$_2$O at the cold state, with a reduction in dimensions. The formed low-dimensional dihydrated perovskite is further decomposed as shown the equation below:

$$MA_4PbX_6 \cdot 2H_2O \rightarrow PbX_2 + 4MA^+ + 4X^- + 2H_2O.$$

The presence of strong hydrogen bonding between water molecules and the toxic PbX$_2$ leads to a high solubility constant (K$_{sp}$=~10$^{-8}$) of PbX$_2$ in water, which causes severe Pb leakage, threatening the environment and human health. To examine the Pb leakage issue, both the pristine TPW and MTPW were immersed in deionized water. As shown in FIG. 39A, the pristine TPW immediately changed color to yellow within only 1 second, implying Pb leakage. The X-ray diffraction (XRD) pattern of the yellow film shown in FIG. 39B proves that the T-Perovskite film decomposed to PbI$_2$. In contrast, the MTPW maintained the transparent state for as long as 5 min underwater. Moreover, the color still changed upon heating, indicating that the T-Perovskite was well preserved and that the thermochromic effect was maintained. To further estimate the amount of Pb$^{2+}$ ions in the contaminated water, inductively coupled plasma-mass spectrometry (ICP-MS) measurements were conducted, as shown in FIG. 39C. The Pb$^{2+}$ concentration in water for the pristine TPW reached 4.023 mg/L in 30 min, which was 66 times higher than that for the MTPW (0.061 mg/L). These results strongly prove that the superhydrophobic MTPW is capable of immobilizing Pb$^{2+}$ and reducing Pb leakage, making the MTPW more eco-friendly.

Example 6

Application of MTPW

The MTPW exhibited better moisture and water resistance and simultaneously less lead leakage compared with the pristine TPW. Moreover, the all-solution-based fabrication process without the need for any extra toxic antisolvent provides the potential for scalability of the MTPW. These advantages enabled the direct fabrication of the MTPW as a flexible window film without the need for sealing, which is more convenient and cost-effective for real applications and installation. Here, an MTPW film with high flexibility was achieved by coating the T-Perovskite, PHPS, and SiO$_2$ nanoparticles in sequence on a PET film (FIG. 40A).

Compared with widely used commercial energy-saving window films that have a dark color (FIG. 40B) and can block part of visible and near-infrared light to constantly reduce indoor solar heat gain even in cold weather, the solar transmittance of the present MTPW film was dynamically modulated with temperature changes, which maintained the useful solar heat gain in cold weather/seasons but reduced harmful solar heat gain in hot weather/seasons (FIG. 40C). Therefore, the MTPW is expected to have better all-year energy-saving ability than traditional energy-saving window films.

To compare the energy-saving performance, EnergyPlus modeling was conducted for a commercial building using a commercial window film and the MTPW film (FIGS. 40A and 40B) in five cities of the US (FIG. 41). The basic building information is listed in the table as shown in FIG. 42, and the optical information of the normal window, the window with the commercial film and the window with the MTPW film (FIG. 43) used in the simulation was calculated via the WINDOW algorithm developed by the Lawrence Berkeley National Laboratory (FIG. 44). The climate information of each city is listed in the table as shown in FIG. 45.

In general, the EnergyPlus modeling for typical cities in the U.S. proved that the use of the MTPW film showed higher energy-saving potential than the commercial film, especially in the northern areas where buildings also have a high heating demand in winter (FIGS. 46 and 47) (e.g., use of the traditional window film led to only 0.4% energy savings in Philadelphia and even caused more annual energy consumption (−1.9%) in New York).

Specifically, taking Philadelphia as an example, the heating energy consumption in buildings with traditional window films was much higher than that in buildings with normal windows, especially in winter from November to March of the next year (FIG. 48), which eventually offset the saved cooling energy in hot weather (FIG. 49). In contrast, enabled by the smart thermally responsive color switching ability, the MTPW maintained a high solar heat gain in cold weather but a low solar transmittance in hot weather. Therefore, the heating demand when using the MTPW film did not significantly change compared to that when using the normal window in winter, whereas the cooling demand dramatically decreased in the transition seasons and in summer from April to October (FIG. 48), demonstrating the advantage of the smart optical regulation function. For the hot areas (e.g., Orlando), the windows with the MTPW and commercial window film both showed better energy-saving ability than the normal window (FIGS. 50 and 51), and the MTPW window exhibited better performance due to the lower solar transmittance.

In sum, the above results suggest that the MTPW window film is promising for reducing HVAC energy consumption throughout the year, and its application as smart energy-efficient window films.

The invention has been given by way of example only, and various other modifications of and/or alterations to the described embodiment may be made by persons skilled in the art without departing from the scope of the invention as specified in the appended claims.

The invention claimed is:

1. A composite material comprising:
   a first layer of thermochromic perovskite including a surface;
   a second layer of antireflection material including a surface and comprising an organic or inorganic polymer, the second layer is deposited on the surface of the first layer; and
   a third layer of hydrophobic material deposited on the surface of the second layer;
   wherein the second layer and the third layer are configured to permit a suitable amount of water vapor to reach the first layer to allow for hydration and dehydration of the first layer for supporting thermochromism of the first layer, and wherein each of the first, second, and third layers remains light-permeable after the thermochromism.

2. The composite material as claimed in claim 1, wherein the first layer comprises a substrate being made of glass or PET with a layer of thermochromic perovskite deposited thereon.

3. The composite material as claimed in claim 2, wherein the layer of thermochromic perovskite is 1.6 μm thick.

4. The composite material as claimed in claim 1, wherein the thermochromic perovskite comprises a halide perovskite-based compound having a general formula of $A_4BX_6 \cdot 2H_2O$, with A being a monovalent organic cation, B being a bivalent cation, and X being one or more of a halide.

5. The composite material as claimed in claim 4, wherein $A_4BX_6 \cdot 2H_2O$ is reversibly changed to $ABX_3$ in response to a temperature change.

6. The composite material as claimed in claim 5, wherein A is selected from any one of $$CH_3NH_{3+}$$

and $$CH(NH_2)_{2+};$$

B is selected from any one of $Pb^{2+}$, $Sn^{2+}$, $Ge^{2+}$, $Mg^{2+}$, and $Ca^{2+}$; and X is selected from any one of $I^-$, $Br^-$, $Cl^-$ and a combination thereof.

7. The composite material as claimed in claim 6, wherein the halide perovskite-based compound has a general formula of $(CH_3NH_3)_4PbI_{6-x-y}Br_xCl_y \cdot 2H_2O$, with x and y each being 0 or a positive integer, and $x+y \leq 6$.

8. The composite material as claimed in claim 7, wherein the halide perovskite-based compound is $(CH_3NH_3)_4 PbI_{6-y}Cl_y \cdot 2H_2O$, with y being 0 to 6.

9. The composite material as claimed in claim 1, wherein the antireflection material has a refractive index that is in between air and the thermochromic perovskite.

10. The composite material as claimed in claim 9, wherein the antireflection material comprises any one of epoxy, poly(methyl methacrylate), polyvinylpyrrolidone, poly(vinyl alcohol), polydimethylsiloxane, poly(acrylic acid), poly(acrylamide), poly(aniline), poly(ethylene oxide), poly(N-acryloxysuccinimide), poly(N-isopropylacrylamide), poly(N-isopropylmethacrylamide), poly(N-vinylcaprolactam), poly(N-vinylpyrrolidone), poly(methacrylic acid), poly(styrene sulfonic acid), polyurethane, poly(propylene oxide), perhydropolysilazane or a combination thereof.

11. The composite material as claimed in claim 10, wherein the antireflection material is perhydropolysilazane.

12. The composite material as claimed in claim 11, wherein the perhydropolysilazane takes the form of a homogenous inorganic film comprising $SiO_x/SiON_x$.

13. The composite material as claimed in claim 1, wherein the hydrophobic material comprises a superhydrophobic layer.

14. The composite material as claimed in claim 13, wherein the superhydrophobic layer comprises a layer of fluorinated nanocoating.

15. The composite material as claimed in claim 14, wherein the layer of fluorinated nanocoating is any one of fluorinated $SiO_2$, fluorinated $TiO_2$, and fluorinated ZnO.

16. A method for preparing the composite material as claimed in claim 1, comprising the steps of:
   coating a thermochromic perovskite on a substrate being made of glass or PET to form a first layer;
   coating an antireflection material on the first layer to form a second layer; and
   coating a silica-based nanoparticles on the second layer to form a third layer.

17. The method as claimed in claim 16, wherein the thermochromic perovskite is subjected to annealing after it is coated on the substrate to form the first layer.

18. The method as claimed in claim 17, wherein the thermochromic perovskite is a halide perovskite-based precursor of $(CH_3NH_3)_4PbI_{6-y}Cl_y \cdot 2H_2O$, with y being 0 to 6, prepared by mixing $CH_3NH_3I$ and $PbCl_2$ in a molar ratio of about 6.5:1.

19. The method as claimed in claim 17, wherein the annealing is at about 100° C. for about 1 hour.

20. The method as claimed in claim 16, wherein the antireflection material comprises a homogenous inorganic material that is solidified by curing after being spin-coated or blade-coated on the first layer.

21. The method as claimed in claim 20, wherein the homogenous inorganic material is prepared from perhydropolysilazane dissolved in dibutyl ether.

22. The method as claimed in claim 16, wherein the first, second and third layers are formed by solution-based coating method.

23. The method as claimed in claim 22, wherein the first and second layers are formed by spin-coating.

24. The method as claimed in claim 23, wherein the third layer is formed by ultrasonic spray-coating.

25. The method as claimed in claim 24, wherein the silica-based nanoparticles are $SiO_2$ nanoparticles, which are deposited on the second layer by coating a solution of the $SiO_2$ nanoparticles and atomizing solvent in the solution simultaneously by way of ultrasonic spray-coating method.

* * * * *